(12) United States Patent
Whitney et al.

(10) Patent No.: US 11,193,719 B2
(45) Date of Patent: Dec. 7, 2021

(54) MOLTEN-SALT-HEATED INDIRECT SCREW-TYPE THERMAL PROCESSOR

(71) Applicants: John Potee Whitney, Dallas, TX (US); Preston Ochs Whitney, Dallas, TX (US)

(72) Inventors: John Potee Whitney, Dallas, TX (US); Preston Ochs Whitney, Dallas, TX (US)

(*) Notice: Subject to any disclaimer, the term of this patent is extended or adjusted under 35 U.S.C. 154(b) by 407 days.

(21) Appl. No.: 15/829,975

(22) Filed: Dec. 3, 2017

(65) Prior Publication Data

US 2019/0170449 A1    Jun. 6, 2019

(51) Int. Cl.
| | |
|---|---|
| *F28D 20/02* | (2006.01) |
| *F28D 11/02* | (2006.01) |
| *F28D 20/00* | (2006.01) |
| *F28F 5/06* | (2006.01) |

(52) U.S. Cl.
CPC ............ *F28D 20/021* (2013.01); *F28D 11/02* (2013.01); *F28D 20/0034* (2013.01); *F28D 20/025* (2013.01); *F28F 5/06* (2013.01); *F28D 2020/0047* (2013.01); *F28F 2265/06* (2013.01); *F28F 2265/14* (2013.01)

(58) Field of Classification Search
CPC .. F28D 20/021; F28D 20/0034; F28D 20/025; F28D 11/02; F28D 2020/0047; F28F 5/06; F28F 2265/06; F28F 2265/14
See application file for complete search history.

(56) References Cited

U.S. PATENT DOCUMENTS

| | | | | |
|---|---|---|---|---|
| 2,375,760 | A * | 5/1945 | Fahnestock | ............... C09K 5/12 252/71 |
| 7,993,048 | B1 * | 8/2011 | Collette | ............... E01C 19/1031 366/147 |
| 10,495,388 | B1 * | 12/2019 | Zheng | ........................ F28B 1/06 |
| 2006/0019136 | A1 * | 1/2006 | Alp | ................... H01M 8/04723 429/434 |
| 2008/0233527 | A1 * | 9/2008 | Heinrich | ............... F28D 20/021 432/13 |

(Continued)

FOREIGN PATENT DOCUMENTS

CN                203479118 U   *   3/2014

*Primary Examiner* — Devon Russell

(57) ABSTRACT

A body of heat transfer fluid circulates in a first loop through an indirect screw-type thermal processor, a rundown tank, a pump, a heater and a fill tank, continuously heating the processor. With the pump operating, a first vertical distance between the fill tank bottom and the processor under the influence of gravity sets a minimum fluid pressure at the processor; a stem pipe opening in the fill tank at a second vertical distance above the processor sets a maximum pressure. With the pump inactive, the entire body of fluid passively drains to the rundown tank. Supplying the fluid may entail melting a salt, hydrating a salt, or both; such may be done in the rundown tank before circulation through the processor begins. A hydrated salt may be circulated, then heated and dehydrated, to gradually warm the processor. A dehydrated salt may be rehydrated and then stored; this may be done in the rundown tank after ceasing circulation through the processor. Also described: misting hydration and variable-speed-pump pressure regulation.

12 Claims, 7 Drawing Sheets

(56) References Cited

U.S. PATENT DOCUMENTS

| | | | | |
|---|---|---|---|---|
| 2010/0258265 A1* | 10/2010 | Karanikas | ............... | E21B 36/04 |
| | | | | 165/45 |
| 2011/0113777 A1* | 5/2011 | De Amicis | .......... | F28D 20/0056 |
| | | | | 60/641.8 |
| 2012/0132398 A1* | 5/2012 | Jeter | ....................... | F28D 11/02 |
| | | | | 165/104.15 |
| 2013/0098750 A1* | 4/2013 | Nickerson | ................ | C10J 3/723 |
| | | | | 201/1 |
| 2013/0224104 A1* | 8/2013 | Naterer | ................ | F22B 27/165 |
| | | | | 423/648.1 |
| 2014/0033708 A1* | 2/2014 | Groppel | .................. | F01K 13/02 |
| | | | | 60/641.8 |
| 2014/0041600 A1* | 2/2014 | Rinaldi | ..................... | F01K 3/00 |
| | | | | 122/32 |
| 2017/0283674 A1* | 10/2017 | Ramesh | ................. | F24S 80/20 |

* cited by examiner

MOLTEN-SALT-HEATED INDIRECT SCREW-TYPE THERMAL PROCESSOR

BACKGROUND OF THE INVENTION

1. Field of the Invention

The present invention relates generally to the field of thermal processing of materials, more particularly to thermal processing by indirectly heating a process material in a processor, and especially to molten-salt-heated indirect screw-type thermal processors.

2. General Background and State of the Art

U.S. Pat. No. 8,739,963 describes one of many available screw-type thermal processors.

Chinese Utility Model CN203479118U discloses a molten salt energy storage system capable of gravity flow salt evacuation without dependence on a salt evacuation pump.

INVENTION SUMMARY

It is an object of the present invention to provide superior performance and cost-effectiveness in the indirect thermal processing of materials.

It is also an object to provide a fluid-heated indirect thermal processor from which a hot heat transfer fluid, which would solidify or become unworkably viscous upon cooling to ambient temperature, will drain passively before solidifying in the event that its circulation through the processor is interrupted.

It is also an object to provide a fluid-heated indirect thermal processor which operates safely and economically, with heat transfer fluid circulating at temperatures in excess of 800° F., as high as 1100° F., and even higher, should salts usable at such temperatures become available to the apparatus, even when the heat transfer fluid is corrosive and has a solidification temperature as high as 480° F.

It is also an object to provide a fluid-heated indirect thermal processor in which the thermal processor—the portion of the apparatus which transfers heat from a heat transfer fluid to a feed material while conveying the feed material from a feed inlet to a feed outlet—is constructed and operated without any need of ASME pressure boundary certification. For example, in some cases the processor should heat transfer fluid at a pressure very near ambient pressure, i.e., at less than 1 bar, and should not be exposed directly to any source of high-pressure such as a heat transfer fluid circulation pump or the like.

It is also an object to provide a fluid-heated indirect thermal processor that operates safely and economically without dependency on a high-powered electric heating system in addition to a combustion heating system. Such independence in some cases avoids costs associated with access to a regional power grid and costs associated with redundant heating systems.

It is also an object to provide a fluid-heated indirect thermal processor that operates safely and economically without any need for a heat trace on the piping or on the processor itself.

It is also an object to provide a fluid-heated indirect thermal processor which operates safely and economically when started with cold, dehydrated salt, with cold, hydrated salt, or with hot hydrated or dehydrated salt. The apparatus should be able to hydrate a salt on-site, starting with hot or cold dehydrated salt. The apparatus also should be able to reach operating temperature gradually enough to avoid thermal shock to any part of the apparatus, especially the thermal processor, even if both hydration and dehydration of a salt are called for in an operating cycle. The apparatus should be capable of controlled shutdown with prompt, safe, passive disposal of hot salt at a low point in the system followed, if desired, by gradual hydration of hot salt for storage and for later re-starting from ambient temperature without prolonged melting.

In accordance with these objects and with others which will be described and which will become apparent, an exemplary embodiment of molten-salt-indirectly heated screw-type thermal processing apparatus has an indirectly heated screw-type thermal processor; a heater; a rundown tank; and a pump. The apparatus requires an operating volume of a heat transfer fluid for transferring heat from the heater to the thermal processor. The thermal processor has a heat transfer fluid inlet fluidly communicating with the heater and a heat transfer fluid outlet fluidly communicating with the rundown tank. The rundown tank has a fluid-containing portion dimensioned to hold at least the operating volume and has a rundown tank headspace portion above the fluid-containing portion. The rundown tank headspace portion is equipped to relieve a pressure differential between the rundown tank and the ambient environment.

The pump, the heater, the thermal processor and the rundown tank are operatively connected so as, when the pump is active, to establish a heat transfer circulation loop through the heater and the thermal processor.

The pump, the heater, the thermal processor and the rundown tank are operatively connected so as, when the pump is inactive, to establish the fluid-containing portion as the fluid passive drainage destination relative to the pump, the heater and the thermal processor.

Another exemplary embodiment has a gravity tube, a gravity tube upper drain, a gravity tube gas orifice, and a gravity tube lower drain. The gravity tube fluidly communicates with the heat transfer fluid inlet at a first height. The gravity tube fluidly communicates with the heater at a second height, the second height being above the first height.

The gravity tube upper drain also fluidly communicates with the gravity tube at a third height, the third height being above the second height. The gravity tube upper drain fluidly communicates with the rundown tank. The gravity tube gas orifice fluidly communicates with the gravity tube at a fourth height, the fourth height being above the third height. The gravity tube gas orifice also fluidly communicates with the rundown tank headspace portion (and may be regarded as having, e.g., a connector tube running to the rundown tank headspace portion for this purpose).

The gravity tube lower drain fluidly communicates with the gravity tube at a fifth height, the fifth height being below the first height. The gravity tube lower drain fluidly communicates with the rundown tank at a sixth height, the sixth height being below the fifth height.

Another exemplary embodiment has a restrictor located in the gravity tube lower drain at a seventh height, the seventh height between the fifth height and the sixth height. The restrictor is dimensioned to restrict fluid conducting capacity of the gravity tube lower drain, thereby assuring that most of the fluid flows through the processor while enough fluid flows through the restrictor to keep the gravity tube lower drain hot, preventing solidification and obstruction.

In another exemplary embodiment, the gravity tube has a fill tank and the gravity tube upper drain has a stem pipe, the fill tank communicating with the gravity tube at the second height, the stem pipe fluidly communicating with the fill tank at the third height and fluidly communicating with the gravity tube upper drain.

Another exemplary embodiment is selectively configurable to establish a preheating fluid circulation loop through the rundown tank and the heater and to interrupt the heat transfer circulation loop, so that such processes as melting, heating and hydration can be conducted within the rundown tank or within a loop between a heater and the rundown tank while the fluid is not circulating through the processor. Preferably, at least one heater is situated in the preheating fluid circulation loop.

In another exemplary embodiment, the rundown tank is equipped with a heat trace, the heat trace being coextensive with the preheating fluid circulation loop through the rundown tank, so that a path is available for circulating fluid, even when most of the fluid in the rundown tank has cooled and solidified.

Another exemplary embodiment has a fluid hydrator and a hydration fluid supply. The fluid hydrator fluidly communicates with the processor preheating fluid circulation loop and with the hydration fluid supply. The hydration fluid supply is selected from among a supply of water, a supply of steam, and a supply of a hydrating liquid solution.

In another exemplary embodiment, the fluid hydrator has a nozzle, located in the rundown tank headspace portion, configured to gently deposit a hydration fluid in the rundown tank, so that, for example, a molten salt can be hydrated without disrupting the fluid surface and splattering the fluid in the tank.

In another exemplary embodiment, the fluid hydrator has a sparge tube located in the fluid-containing portion of the rundown tank. Alternatively, the fluid hydrator has an eductor located somewhere in the preheating fluid circulation loop or in the heat transfer circulation loop.

Another exemplary embodiment is adapted for a heat transfer fluid having a melting point and a density. The first height and the second height are selected such that a column of the heat transfer fluid extending vertically from the first height to the second height exerts pressure at the second height no greater than 14.9 PSIG when the fluid is at the melting point.

Another exemplary embodiment has at least one external heater located at least partially outside the rundown tank, the preheating fluid circulation loop passing through the external heater.

Another exemplary embodiment has a pressure sensor proximate the heat transfer fluid inlet of the thermal processor and a pump variable speed control, the pump variable speed control being operatively coupled with the pressure sensor so as to slow the pump when the pressure sensor reports a pressure approaching 14.9 PSIG.

In an exemplary embodiment, the heat transfer fluid outlet is located above the first height and a path is provided from the heat transfer fluid inlet for passive drainage to the rundown tank when the pump is inactive.

In an exemplary embodiment, a vacuum breaker fluidly communicates with the heat transfer fluid outlet, preventing vacuum lock interference with drainage of fluid from the processor and preventing vapor lock interference with entry of fluid into the processor.

In an exemplary embodiment, the rundown tank has a sump and a heat trace; the pump has a pump inlet located in the sump or near enough thereto to ingest fluid heated by the heat trace.

In an exemplary embodiment, underpressurization of the rundown tank is relieved by introduction of a padding gas, preferably an inert padding gas such as nitrogen to avoid contaminating a molten salt with carbonates formed from atmospheric carbon dioxide.

Also in accordance with the above objects, a method of operating a molten-salt-indirectly heated screw-type thermal processor includes the steps of:

providing a molten-salt-indirectly heated screw-type thermal processor, the thermal processor having an operating heat transfer fluid temperature range, an operating heat transfer fluid flow rate range and an operating heat transfer fluid pressure range;

providing a body of heat transfer fluid, a heater, and a rundown tank, the heat transfer fluid being capable of conveying heat from the heater to the thermal processor at a temperature within the operating heat transfer fluid temperature range while flowing into the thermal processor at a heat transfer fluid flow rate within the operating heat transfer fluid flow rate range at a pressure within the operating heat transfer fluid pressure range, the heater being capable of heating the heat transfer fluid sufficiently at the flow rate and temperature, the body of heat transfer fluid having volume at least sufficient to operate with the heater and the thermal processor, the rundown tank having capacity more than sufficient to contain all of the body of heat transfer fluid;

delivering the heat transfer fluid from the heater to the thermal processor at the temperature, the flow rate and the pressure while delivering the heat transfer fluid from the thermal processor to the heater; and after the steps of delivering, passively disposing the body of heat transfer fluid in the rundown tank.

An exemplary instance of the method may include, before the step of disposing, a step of producing the heat transfer fluid by melting a solid. While melting the solid, the fluid generated by melting can in some exemplary instances of the method be circulated within or through the rundown tank. In some exemplary instances, this circulation is done while interrupting the heat transfer circulation loop, so that the processor is not exposed to the fluid at that time.

Also in an exemplary instance of the method, the method may be carried out with a heat transfer fluid comprising a melting-point-altering material selected from among: water, a hydrating fluid, a dopant. Such a fluid could, for example, be delivered ready-made or produced nearby for introduction into the apparatus.

In an exemplary variation, before the step of disposing, there is a step of producing the heat transfer fluid by adding to a salt a melting-point-altering material selected from among: water, a hydrating fluid, a dopant. A preliminary step of melting a solid may be added if the fluid has solidified.

In an exemplary instance, after the step of disposing, there is a step of adding to the heat transfer fluid a melting-point-altering material selected from among: water, a hydrating fluid, a dopant, so that the fluid can be stored as a hydrated liquid. This is convenient when, for example, a stored solidified dehydrated salt would require prolonged steps of melting and hydration the next time the apparatus is operated.

In a variation of the method, the heat transfer fluid comprises a salt which is at least partially hydrated and which is at least partly dehydrated before the step of disposing the solution in the rundown tank. It is often preferable to dehydrate the salt fluid before or during the step of delivering the fluid to the processor.

The step of dehydrating and the step of delivering may be at least partially simultaneous. In an exemplary method, the thermal processor has a predetermined maximum tolerable rate of temperature increase, the salt has a melting temperature which increases with decreasing hydration, and the step of dehydrating occurs at a rate such that the thermal processor is warmed at a rate no greater than the maximum tolerable rate of temperature increase.

An exemplary method may be carried out with the step of delivering including steps of measuring the pressure, computing a correction of the pressure, and delivering the heat transfer fluid to the thermal processor at a flow rate adjusted to effect the correction of the pressure.

Preferably, in an exemplary method, the step of delivering includes a step of elevating the heat transfer fluid relative to the thermal processor so as to establish a gravity fluid pressure head with the heat transfer fluid entering the thermal processor at a pressure at least within the operating heat transfer fluid pressure range.

In a highly preferred method, the step of delivering includes a step of passively diverting the heat transfer fluid to bypass the thermal processor in an amount sufficient to prevent the pressure exceeding the operating heat transfer fluid pressure range.

In an exemplary instance, a fill tank fluidly communicates with the heater and with the thermal processor; a stem pipe fluidly communicates with the fill tank and with the rundown tank; the step of elevating includes accumulating the fluid in the fill tank; and the step of passively diverting includes directing the fluid via the stem pipe to the rundown tank.

An exemplary instance is carried out with a thermal processor having a heat transfer fluid inlet at a lower elevation than the heat transfer fluid outlet. In the step of delivering, the fluid enters the thermal processor via the heat transfer fluid inlet and exits the thermal processor via the heat transfer fluid outlet. In the step of disposing, the fluid exits the thermal processor via the heat transfer fluid inlet.

In an exemplary instance, a vacuum breaker fluidly communicates with the heat transfer fluid outlet. In the step of disposing, a gas enters the thermal processor via the vacuum breaker.

In an exemplary instance, the rundown tank has a rundown tank headspace portion and the vacuum breaker fluidly communicates with the rundown tank headspace portion.

In an exemplary instance, the fill tank has a fill tank headspace portion; the rundown tank has a rundown tank headspace portion; and a headspace connector fluidly communicates with the fill tank headspace portion and the rundown tank headspace portion.

In an exemplary instance, the operating heat transfer fluid pressure range is from −12 PSIG to 14.9 PSIG, inclusive.

An exemplary instance has, during the step of melting, a step of measuring a temperature of the solid being melted and a step of initiating the step of delivering when the temperature has reached a predetermined value.

In an exemplary instance, during the step of melting, there is a step of measuring a temperature of the solid being melted and a step of initiating the step of adding when the temperature has reached a predetermined value.

In an exemplary instance, during the step of dehydrating, steam is vented from the rundown tank headspace portion.

In an exemplary instance, the rundown tank has a rundown tank headspace portion and there is a step of supplying a padding gas to the rundown tank headspace portion when the rundown tank headspace portion is underpressurized relative to the ambient environment and a step of venting a gas from the rundown tank headspace portion when the rundown tank is overpressurized relative to the ambient environment. In an exemplary instance, during the step of dehydrating, steam is vented from the rundown tank headspace portion.

In an exemplary instance, during the step of disposing, there is a step of conducting a gas from the rundown tank headspace portion to the thermal processor fluid outlet via the vacuum breaker.

In an exemplary instance, the rundown tank has a rundown tank headspace portion. During the step of delivering, there is a step of conducting a gas from the thermal processor to the rundown tank headspace portion.

In an exemplary instance, during the step of adding, there is a step of measuring a melting-point-altering material content of the heat transfer fluid and a step of initiating the step of delivering when the material content has reached a predetermined value.

In an exemplary, although not necessarily preferred instance of the method, a step of hydrating a dehydrated salt heat transfer fluid is begun while the fluid is circulating in the heat transfer circulation loop, rather than after the fluid has passively drained to the rundown tank.

From experience with the dangers of rupturing a vessel containing molten heat transfer fluid, and mindful of the cost and operational limitations encountered when designing and building thermal processing apparatus with the types of steel that are certifiable for use as pressure boundary materials, the inventors sought a low-cost, high-reliability method of ensuring that heat transfer fluid is never delivered to the thermal processor at a pressure requiring a pressure boundary material. The present invention assures that the fluid is delivered to the thermal processor from a source which derives its pressure from a fluid column height under the influence of gravity and not directly from a pump or other source which could deliver higher pressures. The present invention also assures that, when pumping ceases, fluid located in the gravity tube and fluid located in the thermal processor will drain passively, rather than remaining in place and solidifying in place.

Mindful of a customer's interest in lowering costs of operating in remote rural locations, the inventors sought to avoid any dependency on power in or on a fail-safe pumping system to prevent costly and expensive solidification of molten salt heat transfer fluid inside the thermal processor or inside the piping to or from a heater. The present invention ensures prompt, passive draining of heat transfer fluid from the thermal processor, heater and gravity tube whenever pumping ceases. In the present invention, the rundown tank provides a reservoir at a low point in the apparatus. The rundown tank can receive fluid on its way from the thermal processor back to the heater. The rundown tank can receive drainage from any part of the apparatus at any time drainage is desired. The rundown tank can have a headspace which serves as a gas reservoir and which can be fluidly connected with, e.g., the heater, the fill tank, and the thermal processor.

By setting the first and second heights to limit pressure at the processor fluid inlet to no greater than 14.9 PSIG, the present invention tailors the processor fluid inlet pressure to the object of avoiding the necessity of using ASME pressure boundary materials and construction.

The inventors chose to equip the rundown tank to vent a gas to the ambient environment and to receive a gas from a source selected from other parts of the apparatus or from a padding gas supply. Being familiar with the special requirements of various heat transfer media, they sought to avoid deleterious effects of carbon dioxide and oxygen absorbed from the atmosphere. When the heat transfer fluid is chemically and physically compatible with the constituents of the Earth's atmosphere, such as when the molten salts are below 850° F. in the environment in question, air can be admitted through the gravity tube gas orifice. When it is preferable to close the system, a connector can be used to assure fluid communication between the gravity tube gas orifice and a headspace of another component of the apparatus—preferably, the rundown tank, also in some cases a fill tank. Pressure differentials between the respective headspaces of such components as a thermal processor, a fill tank and a heater can be relieved in this manner, relieving local and systemic pressure differentials while in many cases avoiding loss of gas to the environment or intrusion of atmosphere from the environment. When the operational cycle of the apparatus at times requires the introduction of a gas to compensate for an overall pressure reduction in the apparatus, a padding gas, e.g., nitrogen, is introduced via the gravity tube gas orifice or through a similar orifice in, e.g., a headspace of a rundown tank or thermal processor.

Exemplary embodiments of the apparatus in accordance with the present invention include a gravity tube and a gravity tube upper drain. Some embodiments also include a fill tank and a stem pipe. The inventors wished to provide a consistent source of heat transfer fluid to the thermal processor, even when the rate of delivery of such fluid from the heater fluctuates. This arrangement delivers heat transfer fluid from an elevated reservoir at a head of pressure proportional to the difference between the height of the fluid level in the fill tank and the height of the heat transfer fluid inlet of the thermal processor. As long as enough fluid is being delivered to keep the gravity tube fed, the pressure at the thermal processor fluid inlet will be within a narrow range. The total column height from the stem pipe opening to the heat transfer fluid inlet sets the upper limit of the range; the total column height between the bottom of the fill tank and the heat transfer fluid inlet 38 sets the lower limit. When a gross excess of fluid is delivered to the fill tank, the stem pipe efficiently drains the excess to the rundown tank. When pumping ceases, fluid in the fill tank and fluid that has already entered or passed through the gravity tube will drain passively, one way or another, under the influence of gravity.

In some exemplary embodiments the rundown tank disposes the fluid volume so as to provide a fluid upper surface suitable for hydration by gentle deposition of water mist on the surface. The inventors found sufficient surface area for hydration to be important, because it facilitates the use of salts which have high operating temperatures and correspondingly high melting temperatures. The inventors, wishing to avoid splattering molten salt during hydration, arranged for the hydration water dispenser to provide a mist fine enough not to disrupt the surface of the salt.

The rundown tank has a headspace. Gas may flow from the rundown tank headspace to the gravity tube gas orifice, so that air and its carbon dioxide and oxygen constituents are not drawn into the system. The inventors sought to avoid the formation of carbonates in the salt.

In an embodiment having a rundown tank, the rundown tank is equipped to heat the fluid, and the pump and the rundown tank are configured selectively to circulate the fluid between the pump and the rundown tank. The inventors were aware of difficulties that attend the operation of fluid-heated indirect thermal processors. With a heat transfer fluid which is a salt that solidifies at a temperature well above ambient, such as 288° F. or 448° F., it may be necessary to start the apparatus after the salt has cooled and solidified in the rundown tank. Sometimes, it is desirable to heat a portion of the rundown tank surrounding a pump located there until a small volume of salt has liquefied, start the pump, and recirculate the salt to the rundown tank via the bypass branch. When enough salt has liquefied, the heater can be started and liquefied salt can be delivered to the thermal processor.

In some applications, the inventors contemplate the use of a salt which has a high melting point—so high, that a cold thermal processor would not withstand the temperature gradients caused by the abrupt introduction of the melted salt. The inventors solved this problem by recognizing that the in some cases the salt may be hydrated, lowering the temperature at which it liquefies. To provide water for hydration, the rundown tank has a set of water misting nozzles. The process of hydrating a salt may be started with hot salt at a time when the salt is circulating in the apparatus at a high temperature after warming cold salt in the rundown tank. However, it is preferable to hydrate the salt in the rundown tank, using the water misting nozzles while recirculating the salt to the rundown tank. At shutdown, hot dehydrated salt is drained to the rundown tank; if rehydration is desired, it is done by recirculating fluid to the rundown tank with the rundown tank vent open and the nozzles activated, beginning hydration at about 300° F. for some salts and about 500° F. for others, and continuing until the salt is fully hydrated at a temperature close to ambient.

An exemplary embodiment of the apparatus has a restrictor located in the gravity tube lower drain at a seventh height below the first height and above the fifth height. The inventors intended that only enough fluid would drain through the restrictor to keep this path heated, thereby keeping it open. An additional requirement, however, was that passive drainage be accomplished before salt in the apparatus has time to solidify. In the present invention, the restrictor directs most of the fluid flow to the thermal processor. Only a small fraction of the fluid flow drains through the restrictor. Nevertheless, this fraction is large enough to permit passive drainage of molten salt to be completed in about 30 minutes.

In an exemplary embodiment of the apparatus, the heat transfer fluid outlet is located above the first height, i.e., the level of the processor fluid inlet. The processor is inclined or otherwise so constructed that the fluid drains passively out the processor fluid inlet when pumping has stopped. With a vacuum breaker or a headspace connector fluidly communicating with the heat transfer fluid outlet at a relative high point, any vapor lock during filling or vacuum lock during drainage can be relieved.

The method is practicable even when it includes, while the pump is active, a step of circulating the fluid in the apparatus at a temperature in excess of 1000° F.

Also in accordance with the present invention, an exemplary embodiment of a phase-separating pressure modulator for molten-salt-indirectly heated screw-type thermal processing apparatus comprises a fill tank having a fill tank bottom portion; a heater output tube fluidly communicating with the fill tank at the fill tank bottom portion; a gravity tube fluidly communicating with the fill tank at the fill tank bottom portion and fluidly communicating with a fluid delivery destination; a stem pipe fluidly communicating with the fill tank at an elevation above the fill tank bottom portion; a fill tank headspace portion defined as a portion of the fill tank above the elevation; and a fill tank headspace vent fluidly communicating with the fill tank headspace portion and with a fluid drainage destination. Preferably, the drainage destination is a rundown tank and the fluid delivery destination is a thermal processor.

BRIEF DESCRIPTION OF THE DRAWINGS

For a further understanding of the objects and advantages of the present invention, reference should be had to the following detailed description, taken in conjunction with the accompanying drawing, in which like parts are given like reference numbers and wherein.

DETAILED DESCRIPTION OF THE PREFERRED EMBODIMENTS

Figure 1:
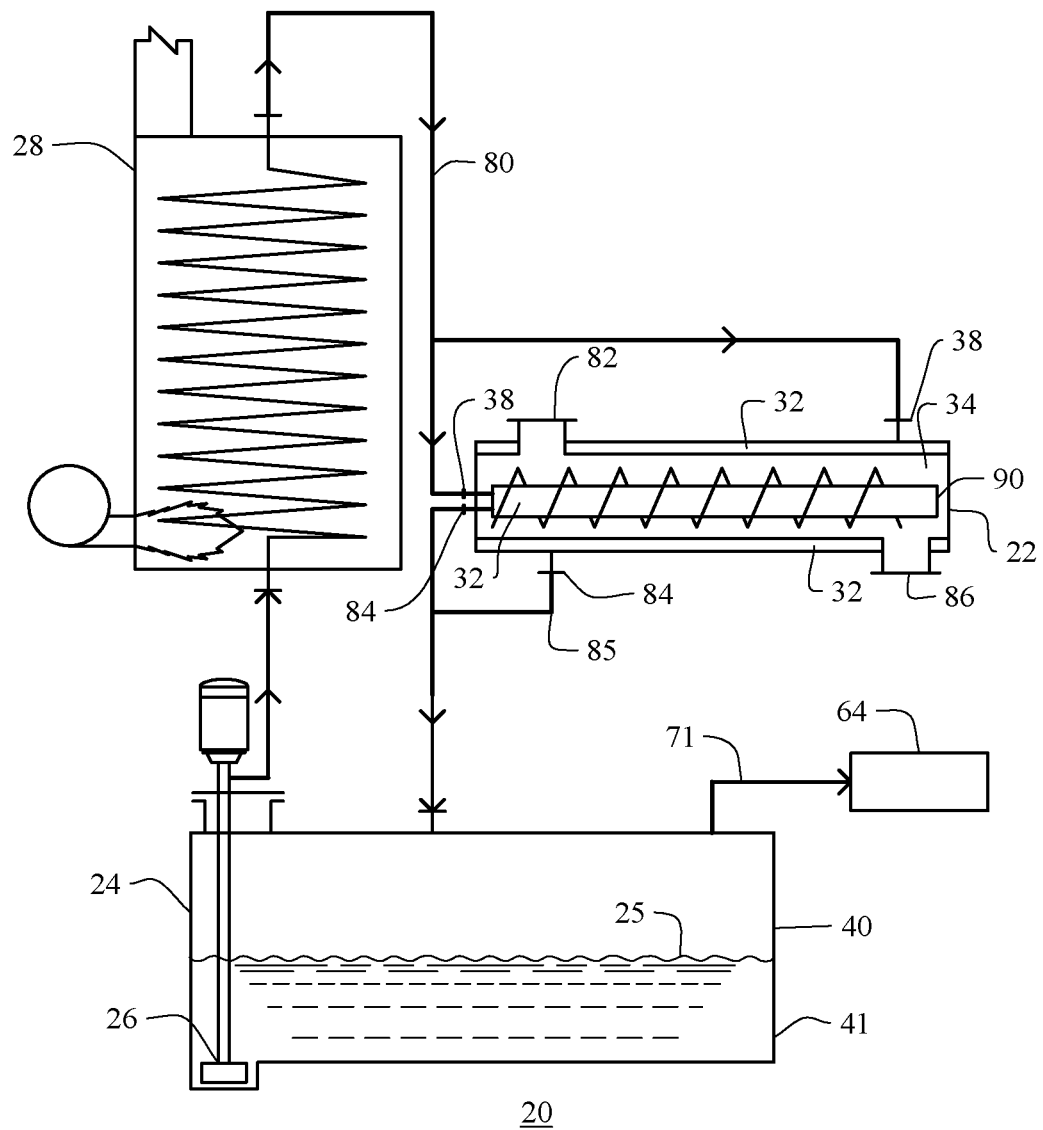
FIG. 1 is a schematic representation of A FIRST EXEMPLARY EMBODIMENT of a molten-salt-indirectly heated screw-type thermal processing apparatus in accordance with the present invention.

The invention will now be described. FIG. 1 illustrates in schematic view A FIRST EXEMPLARY EMBODIMENT of a molten-salt-indirectly heated screw-type thermal processing apparatus in accordance with the present invention, shown generally at 20, having fluidly interconnected a thermal processor 22, a rundown tank 24, a pump 26, and a heater 28.

The thermal processor 22 has heat transfer fluid spaces 32 with heat transfer fluid inlets 38 and heat transfer fluid outlets 84. The thermal processor 22 has a process space 34 with a process material inlet 82 and a process material outlet 86. A fluid outlet drain tube 85 fluidly connects the heat transfer fluid outlets 84 to the rundown tank 24. The thermal processor 22 is configured to transfer heat between the heat transfer fluid spaces 32 and the process space 34. A body of heat transfer fluid 25 (fluid 25) is shown in the rundown tank 24.

A processor fluid inlet tube 87 fluidly connects the heat transfer fluid inlets 38 with the heater output tube 80 of the heater 28. Heat transfer fluid 25 flows from the heater 28, enters through the heat transfer fluid inlets 38, flows through the heat transfer fluid spaces 32, and exits through the heat transfer fluid outlets 84. The heat transfer fluid spaces 32 are passively drainable. The heat transfer fluid spaces 32 are configured to deliver fluid 25 passively to the rundown tank 24 via the fluid outlet drain tube 85.

A conveyor 90 is disposed in the process space 34. Process material enters through the process material inlets 82, receives heat from the heat transfer fluid spaces 32 while the conveyor 90 moves it through the process space 34, and exits through the process material outlet 86. As illustrated, the conveyor 90, which is disposed within the process space 34, includes one of the heat transfer fluid spaces 32. Another 32 surrounds the process space 34.

The pump 26 is configured to propel fluid 25 from the rundown tank 24 to the heater 28.

The heater 28 is passively drainable. The heater 28 is configured to guide the fluid 25 upwardly while heating the fluid 25 and then to deliver the fluid 25 to the thermal processor 22.

With reference to FIG. 1, where the apparatus preferably is arranged in a gravitational field, the processor fluid inlets 38 are at higher elevations in the apparatus; the rundown tank 24 is lowermost; and the heater 28 and thermal processor 22 are at intermediate elevations.

The rundown tank 24 has a rundown tank fluid containing portion 41 with capacity to hold the entire volume of fluid 25 required by the apparatus, and a gas-accommodating rundown tank headspace portion 40 above the rundown tank fluid containing portion 41. The fluid 25 is shown occupying the rundown tank fluid-containing portion 41. The rundown tank headspace portion 40 is equipped with a rundown tank headspace vent 71 providing the ability to relieve a pressure differential relative to the ambient environment, and with a padding valve 64 providing the ability to admit a padding gas to the rundown tank headspace portion 40 to relieve underpressure when air is to be excluded. Additionally, it often is desirable to fluidly connect the rundown tank headspace portion 40 with other gas-containing spaces in the apparatus, e.g., the 32 of the thermal processor 22, to equalize pressure differentials between such spaces when one of them is filling and another is emptying. Such structure, e.g. tubing, is explicitly drawn and described elsewhere herein.

With continued reference to FIG. 1, in a first mode of operation, associated with the thermal processing of a process material, the apparatus transfers heat continuously from the heater 28 to the thermal processor 22. The pump 26 urges the fluid 25 to flow in a heat transfer circulation loop through the heater 28 and the thermal processor 22, i.e., through the heater 28, where the fluid 25 is heated, to the thermal processor 22, where the fluid 25 deposits heat, and back to the heater 28. In FIG. 1, the rundown tank 24 is drawn as being in this heat transfer circulation loop. It should be understood that a tube conveying fluid 25 from the thermal processor 22 to the heater 28 might have sufficient capacity to be regarded as being the rundown tank 24 for purposes of the FIRST exemplary embodiment. However, certain other embodiments described herein will require the rundown tank 24 to be equipped with sensors and to create a fluid surface suitable for hydration.

With continued reference to FIG. 1, it also should be understood that the location and interconnection of the pump 26 may vary, so long as it urges the fluid 25 to travel in the heat transfer circulation loop and so long as the pump 26 drains passively when it is not activated. In this regard, a pump has the advantage that, properly oriented and connected, it allows unimpeded passive drainage when it is not pumping.

The heater 28 heats the fluid 25. The fluid 25 then flows via the heater outlet tube 80, through the heat transfer fluid inlet 38 to the heat transfer fluid spaces 32 of the thermal processor 22. Heat flows from the heat transfer fluid spaces 32 to the process space 34 of the thermal processor 22. The fluid 25 occupies the heat transfer fluid space 32 and then flows from the heat transfer fluid space 32 via the heat transfer fluid outlet 84 via the heat transfer fluid outlet drain tube 85 to the rundown tank 24. While this mode of operation continues, the pump 26 once again urges the fluid 25 to flow in the heat transfer circulation loop.

With continued reference to FIG. 1, in a second mode of operation, the flow of fluid 25 in the heat transfer circulation loop abruptly or unexpectedly ceases—as might occur if the pump 26 stops or the heat transfer circulation loop, heater 28, thermal processor 22, or rundown tank 24 loses integrity while fluid 25 is flowing in the apparatus (see first mode of operation, above), or if for any reason it is desired to stop the apparatus.

After the pump 26 has stopped, fluid 25 in the heater 28 tends to flow backwards from the heater 28, through the pump 26, into the rundown tank 24. As mentioned, the heater 28 is passively drainable: no pumping is necessary in order for fluid 25 in the heater 28 to drain out of the heater 28.

After the pump 26 has stopped, heat transfer fluid 25 in the heater output tube 80 tends to flow either backward to the heater 28 or forward into the heat transfer fluid spaces 32 of the thermal processor 22. In this circumstance, fluid 25 in the heat transfer fluid spaces 32 of the thermal processor 22 tends to flow to the rundown tank 24. As mentioned, the heat transfer fluid spaces 32 are passively drainable: no pumping is necessary in order for fluid 25 in the heat transfer fluid spaces 32 to drain out of the heat transfer fluid space 32. With particular reference to FIG. 1, as the apparatus is drawn in this figure, the heat transfer fluid 25 enters the heat transfer fluid space 32 from above and exits the heat transfer fluid space 32 to below. Alternatively, the relative elevations of the heat transfer fluid inlet 38 and heat transfer fluid outlet 84 may be approximately equal, and the fluid 25 would nevertheless drain from the heat transfer fluid space 32 to the rundown tank 24.

Because the heater 28 and heat transfer fluid space 32 are passively drainable, it is practicable to configure these structures such that, in the event that the pump 26 abruptly or unexpectedly stops while fluid is in the heat transfer circulation loop, the fluid 25 will drain down to the rundown tank 24 passively, rather than remaining elsewhere in the heat transfer circulation loop. Preferably, the fluid 25 that drains passively is collected in the rundown tank 24; however, as mentioned above, a different structure, not strictly regarded as a tank but suitably dimensioned and equipped and located at a low elevation in the heat transfer circulation loop, may serve adequately in this FIRST embodiment.

Figure 2:
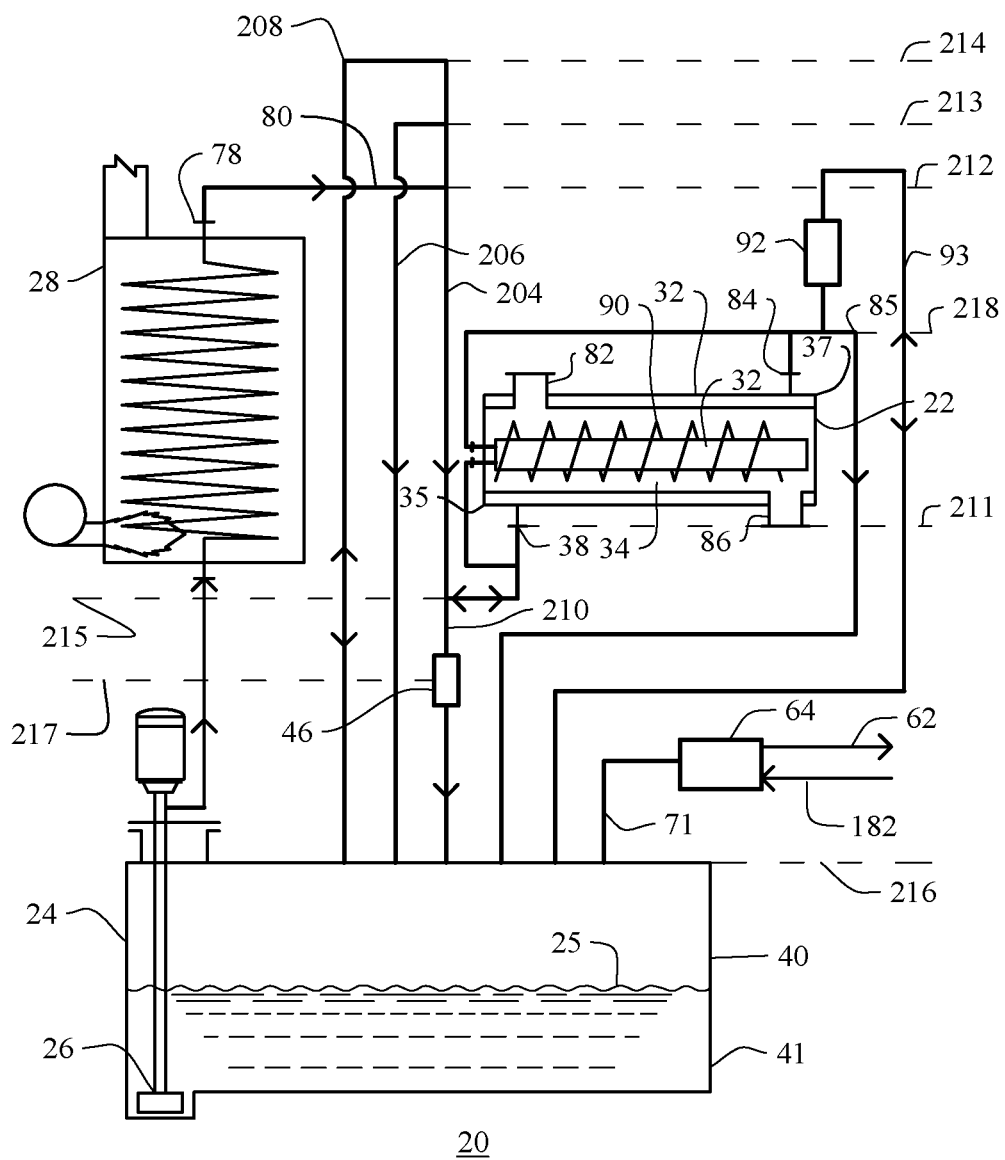
FIG. 2 is a schematic representation of SECOND and THIRD EXEMPLARY EMBODIMENTS thereof.

FIG. 2 is a schematic view of A SECOND EXEMPLARY EMBODIMENT of a molten-salt-indirectly heated screw-type thermal processing apparatus in accordance with the present invention, shown generally at 20, having a thermal processor 22 with heat transfer fluid spaces 32, heat transfer fluid inlets 38, heat transfer fluid outlets 84, process space 34, conveyor 90, process material inlet 82 and process material outlet 86; a rundown tank 24 with rundown tank fluid-containing portion 41 (containing a fluid 25) and rundown tank headspace portion 40; a pump 26, and a heater 28. The heater 28 has a heater outlet 78 and a heater output tube 80.

A gravity tube 204 fluidly communicates with the heat transfer fluid inlet 38 at a first height 211 and with the heater output tube 80 at a second height 212. The second height 212 is above the first height 211.

A gravity tube upper drain 206 fluidly communicates with the gravity tube 204 at a third height 213. The third height 213 is above the second height 212. The gravity tube upper drain 206 also fluidly communicates with the rundown tank headspace portion 40.

A gravity tube gas orifice 208 fluidly communicates with the gravity tube 204 at a fourth height 214. The fourth height 214 is above the third height 213. The gravity tube gas orifice 208 fluidly communicates with the rundown tank headspace portion 40.

A gravity tube lower drain 210 fluidly communicates with the gravity tube 204 at a fifth height 215. The fifth height 215 is below the first height 211. The gravity tube lower drain 210 fluidly communicates with the rundown tank headspace portion 40 at a sixth height 216. The sixth height 216 is below the fifth height 215.

The gravity tube 204 feeds fluid 25 to the thermal processor 22, and also to the rundown tank headspace portion 40 via the gravity tube lower drain 210. The gravity tube upper drain 206 conducts excess fluid flow to the rundown tank headspace portion 40 as will be discussed in more detail below. The gravity tube gas orifice 208 relieves pressure differentials should they develop between the gravity tube 204 and the rundown tank headspace portion 40. The gravity tube lower drain 210 provides for passive drainage from the thermal processor 22 to the rundown tank 24 should fluid 25 cease to flow in the heat transfer circulation loop and, while fluid 25 is flowing, maintains enough fluid flow to avoid being obstructed by solidifying cooled fluid 25.

With regard to the thermal processor 22 as drawn in FIG. 2, notably, the heat transfer fluid inlets 38 are at elevations below the elevations of the respective heat transfer fluid outlets 84. The thermal processor 22 has a thermal processor low portion 35 and a thermal processor high portion 37. The heat transfer fluid inlets 38 are located on the thermal processor low portion 35 on the conveyor 90. The heat transfer fluid outlets 84 are located on the thermal processor 22 high portion 37 and on the conveyor 90. A fluid outlet drain tube 85 fluidly connects the heat transfer fluid outlets 84 to the rundown tank headspace portion 40. The fluid outlet drain tube 85 incorporates a vacuum breaker 92. A vacuum breaker connector tube 93 fluidly connects the vacuum breaker 92 with the rundown tank headspace portion 40. The vacuum breaker 92 fluidly communicates with the heat transfer fluid outlets 84 and the vacuum breaker connector tube 93 at an eighth height 218 within a range between the first height 211 and the second height 212.

FIG. 2 is now referenced digressively to introduce A THIRD EXEMPLARY EMBODIMENT of a molten-salt-indirectly heated screw-type thermal processing apparatus in accordance with the present invention, having a restrictor 46 located in the gravity tube lower drain 210 at a seventh height 217. The seventh height 217 is between the fifth height 215 and the sixth height 216. The restrictor 46 has a restrictor cross-section, the heat transfer fluid outlet 84 of the thermal processor 22 has a combined heat transfer fluid outlet cross-section, and the restrictor cross-section is a predetermined fraction of the heat transfer fluid outlet cross-section.

With continued reference to FIG. 2 and to the SECOND and THIRD exemplary embodiments, in the previously discussed first mode of operation, with the pump 26 activated and a body of fluid 25 provided for the system, the fluid 25 flows from the heater outlet 78, via the heater output tube 80, to the gravity tube 204, where it flows downward under the influence of gravity. A major portion of the fluid 25 passing through the gravity tube 204 flows through the heat transfer fluid inlets 38 at the thermal processor low portion 35, into the heat transfer fluid spaces 32, where it fills the heat transfer fluid spaces 32 and eventually exits the heat transfer fluid outlets 84 at the thermal processor high portion 37 and flows through the fluid outlet drain tube 85 to the rundown tank headspace portion 40. A minor portion of the fluid 25 passing through the gravity tube 204 passes through the restrictor 46 to the rundown tank headspace portion 40.

With continued reference to FIG. 2, in the previously discussed second mode of operation, after the pump 26 has stopped, fluid 25 in the heater output tube 80 and gravity tube 204 tends to flow either backwards through the heater outlet 78 into the heater 28 and from there ultimately into the rundown tank 24, or down the gravity tube 204, into the gravity tube lower drain 210, through the restrictor 46, into the rundown tank headspace portion 40. Fluid 25 in the heat transfer fluid spaces 32 tends to flow backward through heat transfer fluid inlets 38 at the thermal processor low portion 35, into the gravity tube lower drain 210, through the restrictor 46, to the rundown tank headspace portion 40.

With continued reference to FIG. 2, in a third mode of operation, while the pump 26 is active and fluid 25 is flowing in the apparatus, the rate at which fluid 25 passes from the heater output tube 80 to the gravity tube 204 exceeds the rate at which fluid 25 enters the heat transfer fluid inlets 38. One way in which this could occur is for the heat transfer fluid 25 to flow slowly through heat transfer fluid spaces 32 of the thermal processor 22 due to increased viscosity there during a cold startup or due to some other impedance of flow. In any event, in this third mode of operation, the fluid 25 tends to accumulate in the gravity tube 204. In this situation, it may be desirable to establish equilibrium of fluid inflow and outflow of the gravity tube 204. For example, it may be desirable to do so by reducing the output of the pump 26 or heater 28. However, it might transpire that the pump output is not reduced or not sufficiently reduced. Alternatively, or simultaneously, it may be desirable that the fluid overflows without detriment through gravity tube upper drain 206 at height 213. In any event, the apparatus tolerates fluid 25 exiting the heater output tube 80 at a rate greater than the rate at which fluid 25 is entering the heat transfer fluid space 32 of the thermal processor 22, by accommodating the excess flow.

A first means of accommodating excess flow from the heater output tube 80 to the gravity tube 204 in this manner is for the gravity tube 204 to be configured to deliver fluid 25 to the rundown tank 24 while also delivering fluid 25 to the heat transfer fluid space 32. As excess fluid 25 accumulates in the gravity tube 204, its pressure due to gravity increases and the combined rates at which the fluid 25 flows from the gravity tube 204 to the heat transfer fluid space 32 and from the gravity tube 204 through the gravity tube lower drain 210 through the restrictor 46 to the rundown tank headspace portion 40 may approach the rate at which fluid 25 is flowing from the heater 28 to the gravity tube 204. Accomplishing this simultaneous flow is one motivation the inventors had for fluidly connecting the gravity tube 204 to the rundown tank headspace portion 40 as well as to the heat transfer fluid inlets 38. The restrictor 46 serves to establish the heat transfer fluid space 32 of the thermal processor 22 as a favored path of flow, directing a major portion of the fluid flow into that path, while at the same time assuring continuous flow of a minor portion of the fluid flow through the restrictor 46 and into the rundown tank headspace portion 40, so that solidification and consequent blockage do not occur there.

A second means of accommodating this excess flow from the heater 28 into the gravity tube 204 by increasing its rate of exit from the gravity tube 204 is for the gravity tube 204 to be configured such that fluid 25 passively drains to the rundown tank headspace portion 40 via yet another path when, despite flowing both via the heat transfer fluid spaces 32 and via the gravity tube lower drain 210, the heat transfer fluid 25 continues to accumulate in the gravity tube 204. To make this happen, the gravity tube upper drain 206 fluidly connects the gravity tube 204 to the rundown tank headspace portion 40. When fluid 25 in the gravity tube 204 rises to the third height 213, the gravity tube upper drain 206 carries excess fluid 25 directly to the rundown tank headspace portion 40.

With continued reference to FIG. 2, in a fourth mode of operation, the apparatus is started from a rest condition in which most or all of the fluid 25 is in the rundown tank 24 and little or none of the fluid 25 is in the heater 28 or thermal processor 22. Different conditions may prevail at such a time; they will be discussed separately in various parts of this detailed description. Here we describe a first manner of starting the apparatus from such a rest condition.

The rundown tank 24 has a rundown tank fluid-containing portion 41 and the pump 26, wherever located, is fluidly connected so as to be able to urge fluid 25 in the rundown tank fluid-containing portion 41 into and through the heater, wherever the heater 28 is located, and into the gravity tube 204. One suitable variety of pump 26 is a centrifugal pump having an impeller configured to capture fluid 25 centrally and accelerate fluid 25 radially within a housing which directs radially accelerated fluid 25 to, or draws ingestible fluid 25 from, the heater 28. One suitable location for the pump 26 is at a relatively low elevation within the rundown tank fluid- containing portion 41; another is outside the rundown tank 24 and connected to draw fluid 25 therefrom; another is downstream of the heater 28 and upstream of the gravity flow tube. The heater 28 may be located within the rundown tank 24, outside the rundown tank 24, or part inside and part outside, either upstream or downstream of the pump. Whatever the spatial relationships between pump, heater 28 and rundown tank 24, the result is the provision of fluid 25 via the heater output tube 80 to the gravity flow tube 204.

The pump 26 starts. The pump 26 causes fluid 25 to emerge from the heater outlet 78 and flow through the heater output tube 80 into the gravity tube 204. The fluid 25 enters the gravity tube 204, possibly accumulating in the gravity tube 204, building up pressure in the gravity tube 204. Under this pressure, the fluid 25 flows through the gravity tube 204 to the heat transfer fluid spaces 32 of the thermal processor 22. Heat flows from the heat transfer fluid spaces 32 to the process space 34. As the fluid 25 accumulates in the heat transfer fluid spaces 32, it builds up pressure there. When the fluid 25 reaches the respective heights of the heat transfer fluid outlets 84, it flows via the fluid outlet drain tube 85 to the rundown tank 24. While this mode of operation continues, the pump 26 once again pressurizes the fluid 25 and the fluid 25 once again flows to the heater 28. The heat transfer circulation loop is established.

Figure 3:
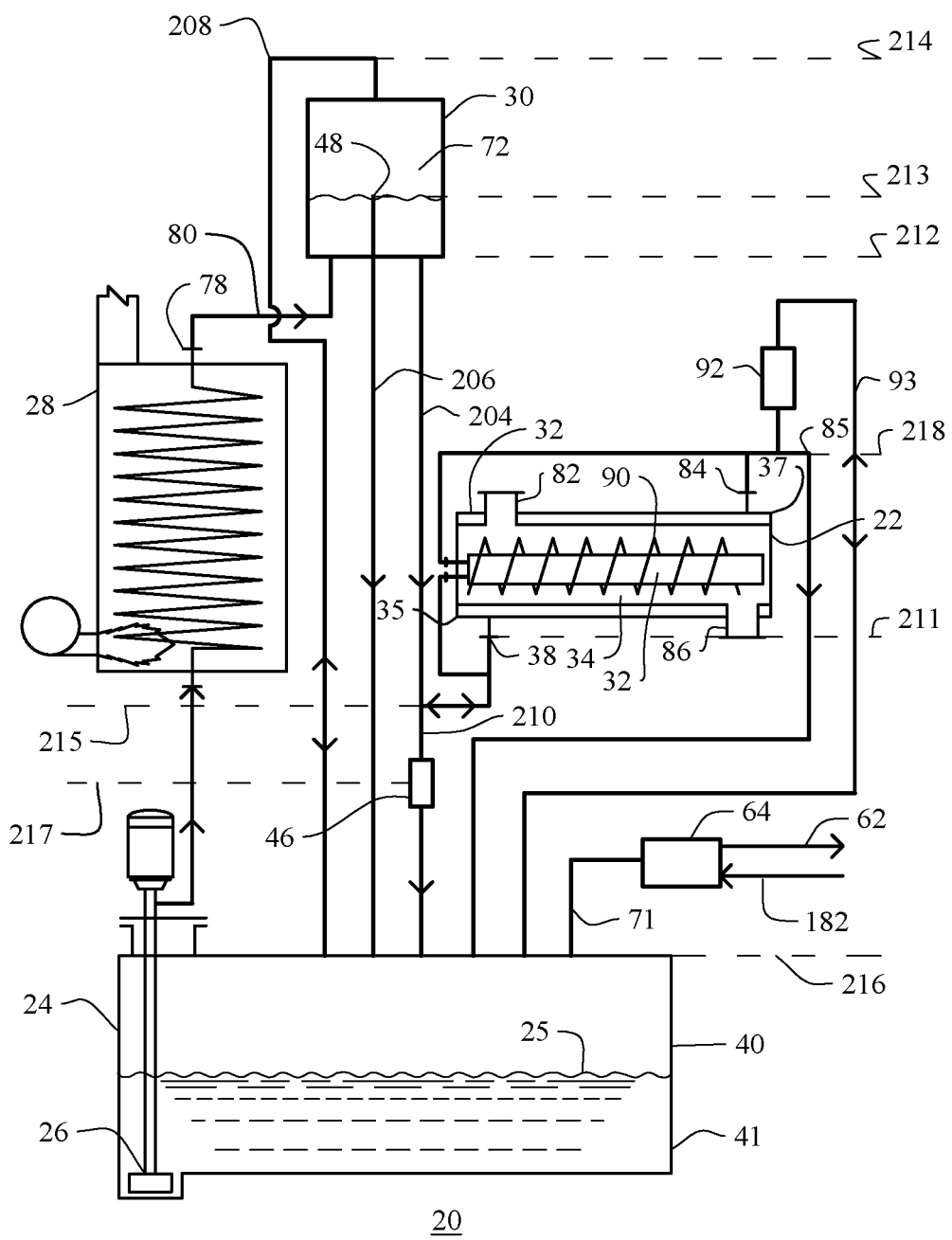
FIG. 3 is a schematic representation of A FOURTH EXEMPLARY EMBODIMENT thereof.

FIG. 3 is a schematic view of A FOURTH EXEMPLARY EMBODIMENT of a molten-salt-indirectly heated screw-type thermal processing apparatus in accordance with the present invention, shown generally at 20, having structure and interconnection as described for the THIRD exemplary embodiment with reference to FIG. 2, but for the presence of a fill tank 30 fluidly communicating with the gravity tube 204 at the second height 212 and with the gravity tube upper drain 206 at the third height 213, and the presence of a stem pipe 48 fluidly communicating with the fill tank 30 at the third height 213 and also with the gravity tube upper drain 206 (the stem pipe 48 provides the means by which the gravity tube upper drain 206 opens upwardly within the fill tank 30).

The apparatus of this FOURTH exemplary embodiment operates largely as described for the THIRD exemplary embodiment with reference to FIG. 2, with a few exceptions. The fill tank 30 provides an increased capacity—a reservoir—of fluid. The stem pipe 48 has an opening in the fill tank 30 at the third height 213 and directs fluid 25 into gravity tube upper drain 206, from which the fluid 25 flows to the rundown tank headspace 40 whenever the fluid level in the fill tank 30 rises above the third height 213. The gravity tube gas orifice 208 fluidly communicates with the fill tank 30 at a higher level, which could be regarded as being within a fill tank headspace portion 72—high enough that it is exposed to gas, but not to liquid, and thus remains open to relieve gas pressure differentials between the rundown tank headspace portion 40 and the fill tank 30.

Figure 4:
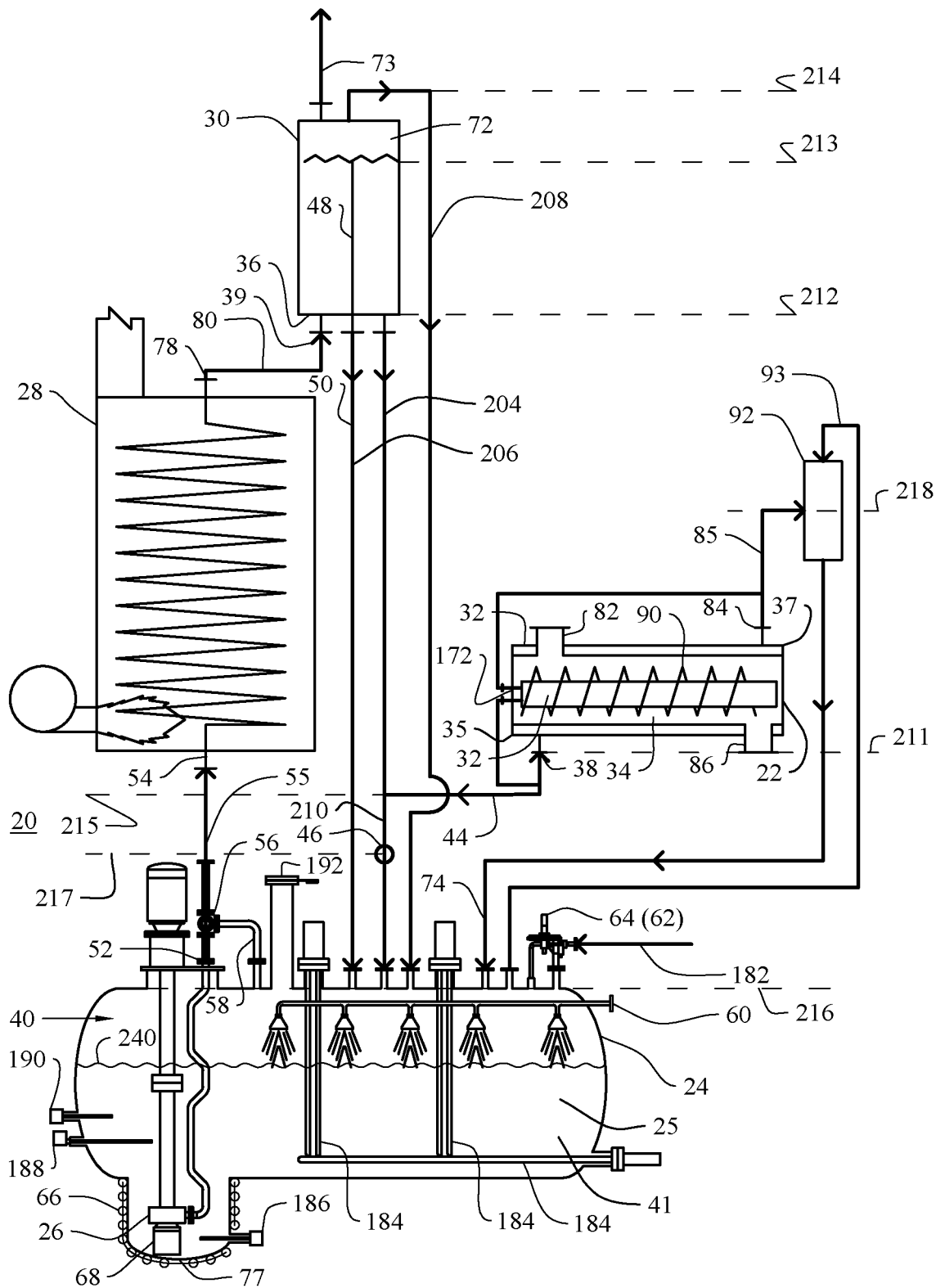
FIG. 4 is a schematic representation of A FIFTH EXEMPLARY EMBODIMENT thereof.

FIG. 4 is a schematic view of A FIFTH EXEMPLARY EMBODIMENT of a molten-salt-indirectly heated screw-type thermal processing apparatus in accordance with the present invention, shown generally at 20. This FIFTH exemplary embodiment is selectively configurable to establish a preheating fluid circulation loop through the rundown tank 24 and the heater 28 and to interrupt the heat transfer circulation loop. The apparatus has a thermal processor 22 with heat transfer fluid spaces 32, heat transfer fluid inlets 38, heat transfer fluid outlets 84, process space 34, conveyor 90, process material inlet 82 and process material outlet 86; a rundown tank 24 with rundown tank fluid-containing portion 41 (containing a fluid 25) and rundown tank headspace portion 40; a pump 26, and a heater 28. The heater 28 has a heater outlet 78 and a heater output tube 80. A fill tank 30—specifically, a fill tank bottom portion 36, fluidly communicates with the heater output tube 80 and with a gravity tube 204 at a second height 212 and with a gravity tube upper drain 206 at a third height 213. The fill tank 30 has a fill tank headspace portion 72. A stem pipe 48 fluidly communicates with the fill tank headspace portion 72 at the third height 213 and also fluidly communicates with the gravity tube upper drain 206.

The fill tank 30 provides an increased capacity—a reservoir—of fluid. The stem pipe 48 has an opening in the fill tank 30 at the third height 213 and directs fluid 25 into gravity tube upper drain 206 communicating to the rundown tank headspace 40 whenever the fluid level in the fill tank 30 exceeds the third height 213. Gravity tube 204 directs fluid 25 to the gravity tube lower drain 210 and to the heat transfer fluid inlets 38. The gravity tube gas orifice 208 fluidly communicates with the fill tank headspace 72 at the fourth height 214—high enough that it is exposed to gas, but not to liquid, and thus remains open to relieve gas pressure differentials between the rundown tank headspace portion 40 and the fill tank 30.

The gravity tube 204 fluidly communicates with the heat transfer fluid inlets 38 at a first height 211 and with the fill tank bottom portion 36 at the second height 212. The second height 212 is above the first height 211.

The gravity tube upper drain 206 fluidly communicates with the fill tank headspace portion 72 at the third height 213. The third height 213 is above the second height 212. The gravity tube upper drain 206 also fluidly communicates with the rundown tank headspace portion 40.

A gravity tube gas orifice 208 fluidly communicates with the gravity tube 204 at a fourth height 214. The fourth height 214 is above the third height 213. The gravity tube gas orifice 208 fluidly communicates with the rundown tank headspace portion 40.

The gravity tube lower drain 210 fluidly communicates with the gravity tube 204 at a fifth height 215. The fifth height 215 is below the first height 211. The gravity tube lower drain 210 fluidly communicates with the rundown tank headspace portion 40 at a sixth height 216. The sixth height 216 is below the fifth height 215.

The gravity tube 204 feeds fluid 25 to the thermal processor 22 via the heat transfer fluid inlets 38 and also feeds fluid 25 to the rundown tank headspace portion 40 via the gravity tube lower drain 210. The gravity tube upper drain 206 conducts excess fluid flow to the rundown tank headspace portion 40 as will be discussed in more detail below. The gravity tube gas orifice 208 relieves pressure differentials should they develop between the fill tank 30 and the rundown tank headspace portion 40. The gravity tube lower drain 210 provides for passive drainage from the thermal processor 22 to the rundown tank 24 should fluid 25 cease to flow in the heat transfer circulation loop and, while fluid 25 is flowing, maintains enough fluid flow to avoid being obstructed by solidifying cooled fluid.

The heat transfer fluid inlets 38 are at elevations below those of the respective heat transfer fluid outlets 84. The thermal processor 22 has a thermal processor low portion 35 and a thermal processor high portion 37. The heat transfer fluid inlets 38 are located on the thermal processor 22 low portion 35. The heat transfer fluid outlets 84 are located on the thermal processor 22 high portion 37. A fluid outlet drain tube 85 fluidly connects the heat transfer fluid outlets 84 to the rundown tank headspace portion 40. The fluid outlet drain tube 85 incorporates a vacuum breaker 92. A vacuum breaker connector tube 93 fluidly connects the vacuum breaker 92 with the rundown tank headspace portion 40. The vacuum breaker 92 fluidly communicates with the heat transfer fluid outlets 84 and the vacuum breaker connector tube 93 at an eighth height 218. The eighth height 218 is above the first height 211 and below the second height 212.

A restrictor 46 is located in the gravity tube lower drain 210 at a seventh height 217. The seventh height 217 is between the fifth height 215 and the sixth height 216. The restrictor 46 has a restrictor cross-section, the heat transfer fluid outlet of the thermal processor 22 has a heat transfer fluid outlet cross-section, and the restrictor cross-section is a predetermined fraction of the heat transfer fluid outlet cross-section.

With continued reference to FIG. 4, in the previously discussed first mode of operation, with the pump 26 activated and a body of fluid 25 provided for the system, the fluid 25 flows from the heater outlet 78, via the heater output tube 80, to the fill tank bottom portion 36, where it accumulates and builds pressure. Meanwhile, from the fill tank bottom portion 36, the fluid 25 flows into the gravity tube 204 and downward therein under the influence of gravity. A major portion of the fluid 25 passing through the gravity tube 204 flows through the heat transfer fluid inlets 38 at the thermal processor low portion 35, into the heat transfer fluid spaces 32, where it fills the heat transfer fluid spaces 32 and eventually exits the heat transfer fluid outlets 84 at the thermal processor high portion 37, and flows through the fluid outlet drain tube 85 to the rundown tank headspace portion 40. A minor portion of the fluid 25 passing through the gravity tube 204 passes through the gravity tube lower drain 210 and the restrictor 46 to the rundown tank headspace portion 40.

With continued reference to FIG. 4, in the previously discussed second mode of operation, after the pump 26 has stopped, fluid 25 in the heater output tube 80, fill tank bottom portion 36, and gravity tube 204 tends to flow either backwards through the heater outlet 78 into the heater 28 and from there ultimately into the rundown tank 24, or down the gravity tube 204, into the gravity tube lower drain 210, through the restrictor 46, into the rundown tank headspace portion 40. Fluid 25 in the heat transfer fluid spaces 32 tends to flow backward through heat transfer fluid inlets 38 at the thermal processor low portion 35, into the gravity tube lower drain 210, through the restrictor 46, to the rundown tank headspace portion 40.

With continued reference to FIG. 4, in a third mode of operation, while the pump 26 is active and fluid 25 is flowing in the apparatus, the rate at which fluid 25 passes from the heater output tube 80 to the fill tank bottom portion 36 exceeds the rate at which fluid 25 enters the heat transfer fluid inlets 38 of the thermal processor 22. One way in which this could occur is for the transfer fluid 25 to flow slowly through heat transfer fluid spaces 32 of the thermal processor 22 due to increased viscosity there during a cold startup or due to some other impedance of flow. However this third mode of operation occurs, the fluid tends to accumulate in the fill tank bottom portion 36. In this situation, it may be desirable to establish equilibrium of fluid inflow and outflow of the fill tank bottom portion 36. For example, it may be desirable to do so by reducing the output of the pump 26 and heater 28. However, it might transpire that the pump output is not reduced or not sufficiently reduced. Alternatively, or simultaneously, it may be desirable for fluid 25 to exit the heater output tube 80 at a rate greater than the rate at which fluid 25 is entering the heat transfer fluid spaces 32 of the thermal processor 22, in which case the excess flow must be accommodated.

A first means of accommodating excess flow from the heater output tube 80 to the fill tank 30 and then into the gravity tube 204 in this manner is for the gravity tube 204 to be configured to deliver fluid 25 to the rundown tank 24 while also delivering fluid 25 to the heat transfer fluid space 32. As excess fluid 25 accumulates in the fill tank 30, its level rises, its pressure increases, and the combined rates at which the fluid 25 flows from the gravity tube 204 to the heat transfer fluid spaces 32 and from the gravity tube 204 through the gravity tube lower drain 210 through the restrictor 46 to the rundown tank headspace portion 40 may approach the rate at which fluid 25 is flowing from the heater 28 to the gravity tube 204. Accomplishing this simultaneous flow is one motivation the inventors had for fluidly connecting the gravity tube 204 to the rundown tank headspace portion 40 via the gravity tube lower drain 210 as well as to the thermal processor 22 via the heat transfer fluid inlets 38. The restrictor 46 serves to establish the heat transfer fluid space 32 of the thermal processor 22 as a favored path of flow, directing a major portion of the fluid flow into that path, while at the same time allowing flow of a minor portion of the fluid flow through the restrictor 46 and into the rundown tank headspace portion 40 as long as fluid 25 is flowing from the fill tank 30 to the gravity tube 204, so that solidification and consequent blockage does not prevent drainage to the rundown tank headspace portion 40.

A second means of accommodating this excess flow from the heater 28 into the fill tank 30 by increasing its rate of exit from the fill tank 30 is for the fill tank 30 to be configured such that fluid 25 passively drains to the rundown tank headspace portion 40 via yet another path when, despite flowing both via the heat transfer fluid space 32 and via the gravity tube lower drain 210, the heat transfer fluid 25 continues to accumulate in the fill tank 30. To make this happen, the stem pipe 48 fluidly communicates with the gravity tube upper drain 206, which is fluidly connected to the rundown tank headspace portion 40. When fluid 25 in the fill tank 30 rises to the third height 213, the stem pipe 48 conducts excess fluid 25 into the gravity tube upper drain 206, where it flows directly to the rundown tank headspace portion 40.

With continued reference to FIG. 4, in a fourth mode of operation, the apparatus is started from a rest condition in which most or all of the fluid 25 is in the rundown tank 24 and little or none of the fluid 25 is in the heater 28, fill tank 30 or thermal processor 22. Different conditions may prevail at such a time; they will be discussed separately in various parts of this detailed description. Here we describe a first manner of starting the apparatus from such a rest condition.

The rundown tank 24 has a rundown tank fluid-containing portion 41 and the pump 26, wherever located, is fluidly connected so as to be able to urge fluid 25 in the rundown tank fluid-containing portion 41 into and through the heater 28, wherever the heater 28 is located, and into the fill tank 30. One suitable variety of pump 26 is a centrifugal pump having an impeller configured to capture fluid 25 centrally and accelerate fluid 25 radially within a housing which directs radially accelerated fluid 25 to, or draws ingestible fluid 25 from, the heater 28. One suitable location for the pump 26 is at a relatively low elevation within the rundown tank fluid-containing portion 41; another is outside the rundown tank 24 and connected to draw fluid 25 therefrom; another is downstream of the heater 28 and upstream of the fill tank 30. The heater 28 may be located within the rundown tank 24, outside the rundown tank 24, or part inside and part outside, either upstream or downstream of the pump 26. Whatever the spatial relationships between pump 26, heater 28 and rundown tank 24, the result is the provision of fluid 25 via the heater output tube 80 to the fill tank 30 and from there to the gravity tube 204.

The pump 26 starts. The pump 26 causes fluid 25 to emerge from the heater outlet 78 and flow through the heater output tube 80 into the fill tank 30. The fluid 25 flows from the fill tank bottom portion 36 into the gravity tube 204, building up a head of pressure in the gravity tube 204. Under this pressure, the fluid 25 flows from the gravity tube 204 through the heat transfer fluid inlets 38 to the heat transfer fluid spaces 32 of the thermal processor 22. Heat flows from the heat transfer fluid spaces 32 to the process space 34. As the fluid 25 accumulates in the heat transfer fluid spaces 32, it builds up pressure there due to its depth. When the fluid 25 reaches the height of the heat transfer fluid outlets 84, it flows out the heat transfer fluid outlets 84, through the fluid outlet drain tube 85, to the rundown tank 24. While this mode of operation continues, the pump 26 once again pressurizes the fluid 25 and the fluid 25 once again flows to the heater 28. The heat transfer fluid circulation loop is established.

The immediately previous description of the FIFTH embodiment with reference to FIG. 4 addresses cases in which the fluid 25 already is in a condition to flow through the apparatus—i.e., cases in which the fluid 25 is not too viscous to flow in a manner approximating that described with reference to the first mode of operation, continuous transfer of heat. That description can be called a first manner of starting the apparatus. However, there are other situations that must be dealt with.

To address cases in which the fluid 25 must be rendered less viscous by heating in order for it to flow in a manner approximating that described with reference to the first mode of operation, continuous transfer of heat, a second manner of starting the apparatus is described, accounting separately for how to establish the described flow of fluid 25 through the rundown tank 24, through the pump 26, through the heater 28, through the fill tank 30, and through the heat transfer fluid spaces 32 of the thermal processor 22. A major portion, if not all, of the fluid 25 is located in the rundown tank fluid-containing portion 41. The fluid 25 is too viscous to flow efficiently through the apparatus. The fluid 25 is of a type whose viscosity decreases with increasing temperature. It is necessary to render the fluid 25 less viscous by heating it.

The rundown tank 24 has a rundown tank headspace portion 40. The rundown tank 24 has a sump 77 that is equipped with a heat trace 66 and has pedestal 68 supporting the pump 26. The rundown tank 24 is equipped with heating elements 184. The rundown tank 24 is equipped with a relief valve 62 and also with a padding valve 64 that is connected to a padding gas supply tube 182. The rundown tank 24 is equipped with a sump temperature sensor 186, a rundown tank hydration measuring device 188, and a rundown tank temperature sensor 190. A set of hydration fluid misting nozzles 60 is located in the rundown tank headspace portion 40 and is connected to a supply of a hydration fluid.

The heater 28, as drawn in FIG. 4, is external to the rundown tank 24. The heater 28 has a heater outlet 78, a heater output tube 80, and a heater inlet 54.

The pump 26 has a pump outlet 52. A pump output tube 55 fluidly connects the pump outlet 52 to the heater inlet 54. A bypass valve 56 is located in the pump output tube 55. A bypass branch tube 58 fluidly connects the bypass valve 56 to the rundown tank headspace portion 40.

A heat trace 66 is located in the rundown tank 24. The heat trace 66 warms the fluid 25 along a path, which may be called the heat trace path, originating in the rundown tank fluid-containing portion 41 and including a portion thereof, proximate the pump 26, from which the pump 26 may draw fluid. When the heat trace 66 is activated to heat the fluid 25 along the heat trace path, the fluid 25 in the heat trace path is warmed until it is capable of flowing into the pump 26.

The impeller of the pump 26 draws fluid 25 from the heat trace path and accelerates the fluid 25 within the pump 26 housing. The pump 26 housing directs the accelerated fluid 25 upward through the pump outlet 52, into to the pump output tube 55, through the heater inlet 54. The fluid 25 enters the heater 28, is heated as it moves through the heater 28, and flows from the heater 28 to the fill tank 30, thence to the thermal processor 22 and to the rundown tank 24, as described herein previously with reference to the first mode of operation.

It may be deemed necessary to warm a substantial portion of the fluid 25 in the rundown tank 24 before beginning to introduce the fluid 25 to the heater 28. To accomplish this objective, the bypass valve 56 (which may be regarded as a selector valve) is operated to allow the pump output tube 55 to fluidly communicate with the bypass branch tube 58 and not with the heater inlet 54. With the heat trace 66 activated, when a sufficient amount of material is sufficiently warmed in the rundown tank fluid- containing portion 41 to provide fluid 25 to be circulated, the pump 26 is activated, delivering fluid 25 back to the rundown tank 24 via the bypass branch tube 58. This process is continued until a sufficient volume of fluid 25 is warmed in the rundown tank 24 to support function of the heater. Then, the bypass valve 56 is operated to allow the pump output tube 55 to fluidly communicate with the heater inlet 54 and not with the bypass branch tube 58. With the pump 26 continuing to run, the fluid 25 flows from the pump 26 to the heater 28. When such condition is reached, the heat trace 66 becomes unnecessary and may be deactivated.

At other times, the fluid 25 must be rendered less viscous by the admixture of another material. For such times, a third manner of starting the apparatus is described. Once again, as discussed above, a major volume of the fluid 25 is located in the rundown tank 24, is too viscous to flow efficiently through the apparatus, and is of a type whose viscosity decreases with increasing temperature. However, in this case, in order to avoid thermally shocking the processor 22, it is necessary to gradually warm the processor 22 by circulating and gradually heating the heat transfer fluid 25. With some types of heat transfer fluids, it may be that the viscosity of the fluid 25 being used is not low enough to flow efficiently until its temperature is so high that it could not be introduced into a cold thermal processor 22 without unacceptable thermal shock. Although the thermal processor 22 could be heated electrically or by other means, in some circumstances the inventors find it preferable to gradually warm the thermal processor 22 by circulating a mixture of fluids through the heat transfer circulation loop including the rundown tank 24, pump 26, heater 28, fill tank 30, and thermal processor 22.

To accomplish this gradual warming of the thermal processor 22 requires several considerations. First to be considered, the fluid mixture is obtained from outside or is made within the apparatus. Second to be considered, the fluid mixture is first circulated through the apparatus at a temperature low enough to be safely introduced into the cold thermal processor 22. Third to be considered, the fluid mixture is heated while being circulated through the apparatus. Fourth to be considered, when the circulating heated fluid mixture has heated the thermal processor 22 to a temperature at which the thermal processor 22 can safely receive a fluid 25 at the temperature at which continuous heating is to be performed, the fluid mixture circulating in the apparatus can be replaced by the fluid 25 that accomplishes continuous heating.

First, the fluid mixture is obtained from outside or is made within the circuit of the apparatus. Generating the fluid mixture is unnecessary if the fluid mixture is delivered as, for example, a hydrated salt solution. Where the fluid mixture must be generated on-site, one approach to generating the fluid mixture is to mist water onto the top of a volume of hot fluid 25 (a melted salt, to be more specific) in the rundown tank 24 and vent steam from the rundown tank headspace portion 40 to the ambient environment. A set of water-misting nozzles 60 is located in the rundown tank headspace portion 40. The rundown tank 24 has a sump 77 that is equipped with a heat trace 66 and has pedestal 68 supporting the pump 26. The rundown tank 24 is equipped with heating elements 184. The rundown tank 24 is equipped with a relief valve 62 and also with a padding valve 64 which is connected to a padding gas supply tube 182. The rundown tank 24 is equipped with a sump temperature sensor 186, a rundown tank hydration-measuring device 188, and a rundown tank temperature sensor 190.

When starting with solidified salt occupying the rundown tank fluid-containing portion 41, the fluid mixture is generated by heating the salt in the rundown tank 24 as described previously with reference to the second manner of starting the apparatus, then slowly misting water onto the melted salt fluid 25 and venting excess steam from the rundown tank 24 to the ambient environment while continuing to recirculate the melted salt through the rundown tank 24 via the bypass valve 56 and the bypass branch tube 58. When the salt is sufficiently hydrated and its temperature is low enough to be introduced safely into the cold thermal processor 22, the nozzles 60 are deactivated, the bypass valve 56 is closed and the next step can begin, namely, circulating the fluid mixture through the heat transfer circulation loop of the apparatus.

Figure 5:
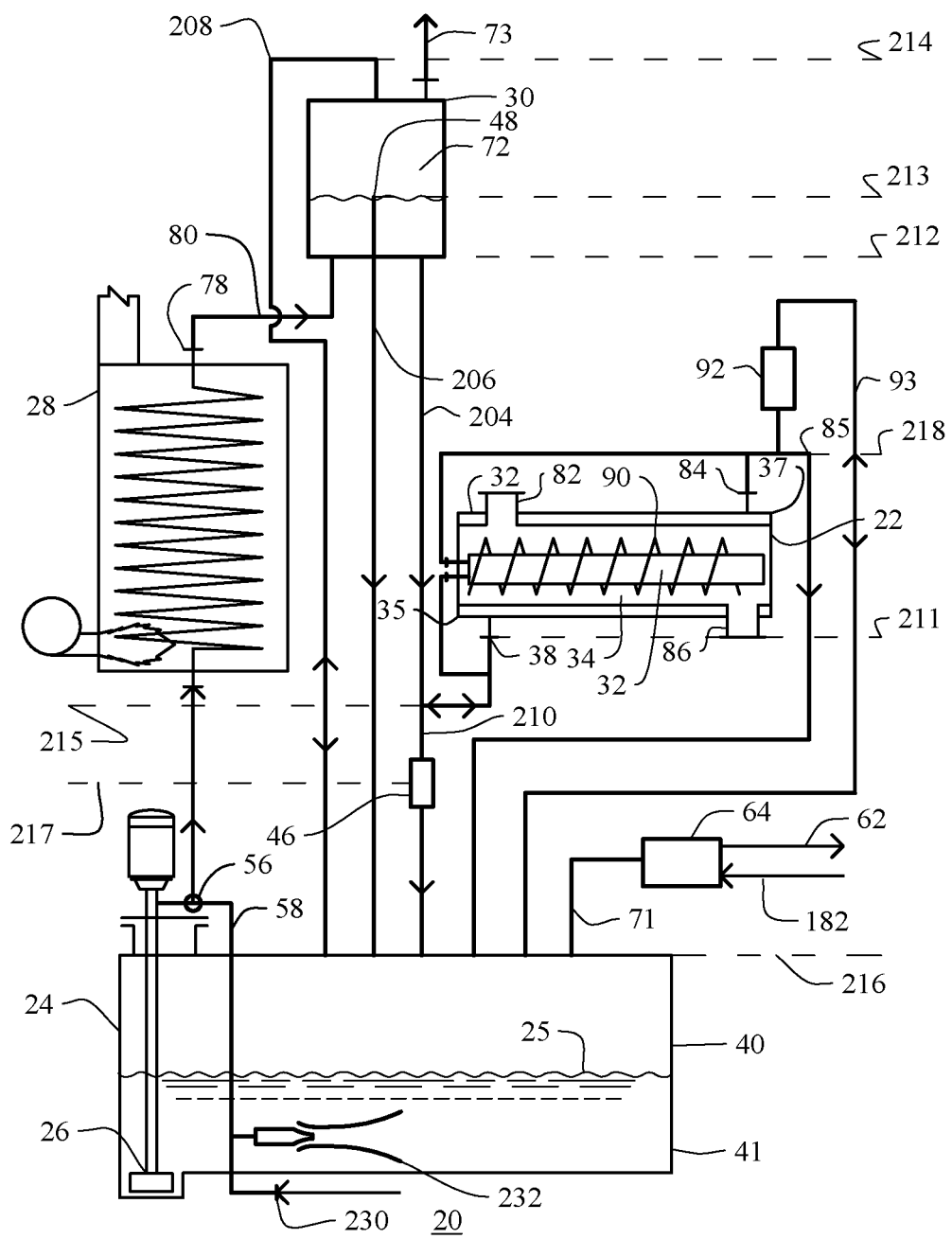
FIG. 5 is a schematic representation of A SIXTH EXEMPLARY EMBODIMENT thereof.

Another approach to generating the fluid mixture is to locate an eductor in the preheating fluid circulation loop. FIG. 5, a schematic representation of a SIXTH EXEM- PLARY EMBODIMENT of a molten-salt-indirectly heated screw-type thermal processing apparatus in accordance with the present invention, shown generally at 20, shows apparatus resembling the FIFTH exemplary embodiment but differing in how it provides an additive to the fluid 25. An eductor 232 is located in the rundown tank fluid-containing portion 41 and is fluidly connected to an additive supply tube 230. The eductor 232 is immersed in or filled with the fluid 25. The additive, e.g., water, steam or another hydrating fluid, enters from the additive supply tube 230 and mixes with the fluid 25 as the fluid 25 passes through the eductor 232. As with the FIFTH exemplary embodiment, either the salt in the rundown tank 24 already is melted, or it must be melted by heating the salt in the rundown tank 24 as described previously with reference to the second manner of starting the apparatus. Once melted salt is available, the eductor 232 is operated and steam is vented from the rundown tank 24 to the ambient environment while the melted salt is recirculated to the rundown tank 24 via the bypass valve 56 and bypass branch tube 58. When the salt is sufficiently hydrated and its temperature is low enough to be introduced safely into the cold thermal processor 22, the eductor 232 is deactivated, the bypass valve 56 is closed and subsequent steps can begin, such as circulating the fluid mixture through the heat transfer circulation loop of the apparatus, adding heat to the hydrated salt, and dehydrating the hydrated salt.

Figure 6:
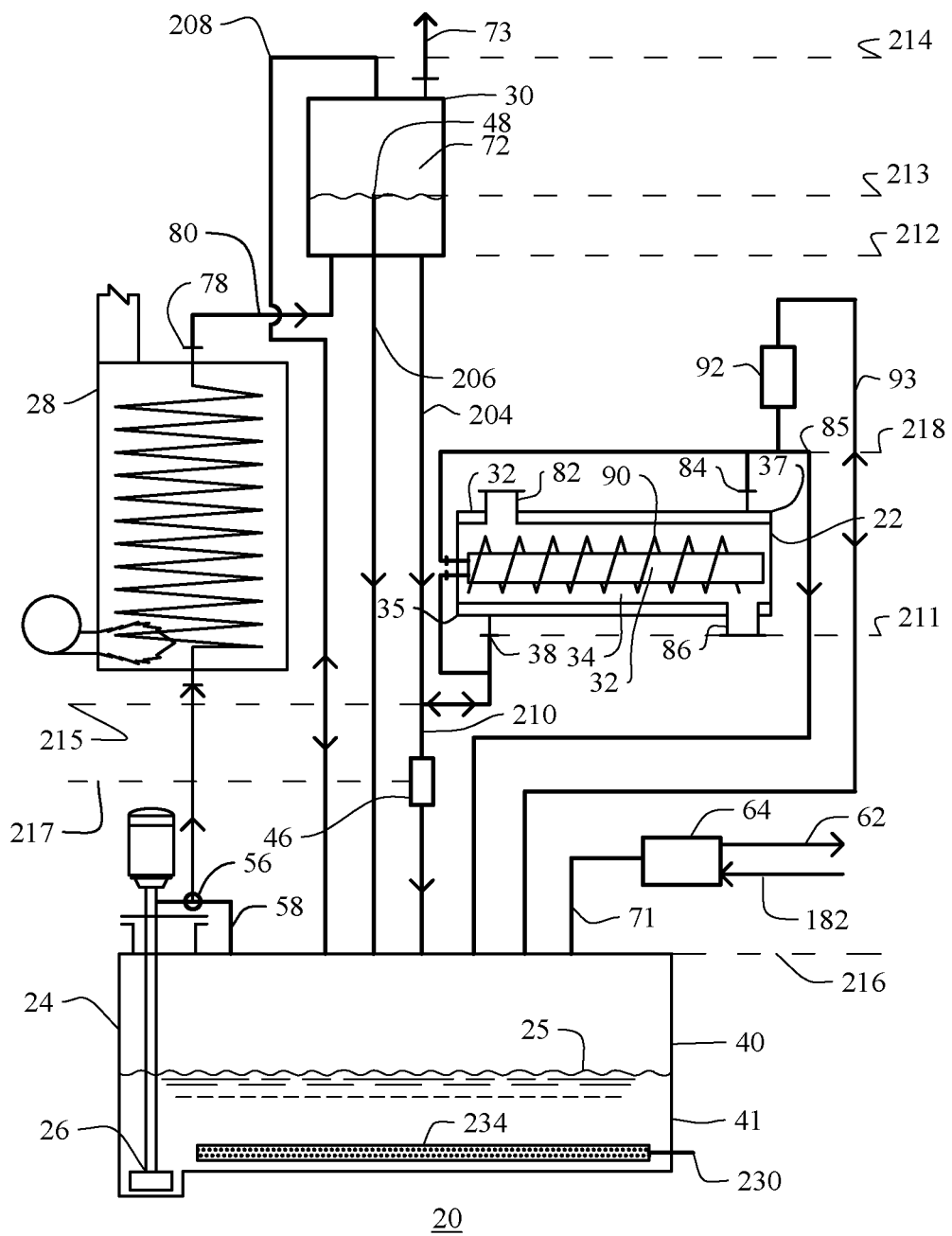
FIG. 6 is a schematic representation of A SEVENTH EXEMPLARY EMBODIMENT thereof.

Yet another approach to generating the fluid mixture is to locate a sparge tube 234 in the rundown tank fluid-containing portion 41. FIG. 6, a schematic representation of a SEVENTH EXEMPLARY EMBODIMENT of a molten-salt-indirectly heated screw-type thermal processing apparatus in accordance with the present invention, shown generally at 20, shows apparatus resembling the SIXTH exemplary embodiment but once again differing in how it provides an additive to the fluid. A sparge tube 234 is located in the rundown tank fluid-containing portion 41 and is fluidly connected to an additive supply tube 230. The sparge tube 234 is immersed in the fluid. The hydration fluid enters from the additive supply tube 230, exits the finely perforated sparge tube 234, and mixes with the fluid in the rundown tank fluid-containing portion 41. As with the FIFTH and SIXTH exemplary embodiments, either the salt in the rundown tank 24 already is melted, or it must be melted by heating the salt in the rundown tank 24 as described previously with reference to the second manner of starting the apparatus. Once melted salt is available, the sparge tube 234 is operated and steam is vented from the rundown tank 24 to the ambient environment while the melted salt is recirculated to the rundown tank 24 via the bypass valve 56 and bypass branch tube 58. When the salt is sufficiently hydrated and its temperature is low enough to be introduced safely into the cold thermal processor 22, the sparge tube 234 is deactivated, the bypass valve 56 is closed and subsequent steps can begin, such as circulating the fluid mixture through the heat transfer circulation loop of the apparatus, adding heat to the hydrated salt, and dehydrating the hydrated salt.

Second, the fluid mixture is circulated through the heat transfer circulation loop of the apparatus at a first temperature low enough not to damage the cold thermal processor 22. The pump 26 ingests the fluid mixture from the rundown tank 24 and propels the fluid mixture to the heater 28. The fluid mixture flows from the heater 28 to the fill tank 30 and from the fill tank 30 to the heat transfer fluid spaces 32 of the thermal processor 22 and then to the rundown tank 24.

Third, the heater 28 is activated and the heat transfer fluid is heated while being circulated through the apparatus. The temperature of the heat transfer fluid increases. The heat transfer fluid 25 warms the thermal processor 22. As the temperature of the heat transfer fluid 25 increases, the degree of hydration decreases and steam is released. Dehydration of the fluid 25 has begun.

Fourth, dehydration of the fluid 25 continues: the fluid 25 is heated and steam is vented until the fluid 25 is suitably dehydrated (in many situations, anhydrous), and is further heated if necessary until it reaches a predetermined temperature at which continuous heating of process material in the thermal processor 22 is to be performed. Thus, the thermal processor 22 is safely and gradually heated from ambient temperature to operating temperature and heat shock is avoided.

An effect of heating the hydrated salt to a temperature at which it begins to dehydrate is the evolution of steam. Steam must be vented from the apparatus as the body of fluid 25 is dehydrated. In one approach to venting steam, the fill tank 30 has a fill tank steam vent 73. A mixture of partially dehydrated salt and steam exits the heater 28 and passes via the heater output tube 80 to the fill tank bottom portion 36. In the fill tank 30, steam rises to the fill tank headspace portion 72 and exits via the fill tank steam vent 73. Alternatively or additionally, exits the fill tank headspace portion 72, via the gravity tube gas orifice 208 and passes to the rundown tank headspace portion 40, which is vented to the ambient environment. In a fifth mode of operation, the apparatus has been operating in the first mode and now is to be shut down in a controlled manner. The manner of shutting the apparatus down depends largely on whether the fluid being used must be rehydrated in order to be used again to restart the apparatus—either because the salt being used melts at a temperature high enough to thermally shock the thermal processor 22, or because the salt melts at a temperature higher than ambient temperature and melting it again when restarting the apparatus would be inefficient or inconvenient.

If the fluid will be usable to restart the apparatus without hydration, then a first manner of shutting down the apparatus is usable—this entails shutting down the input of external energy to the heater 28 and shutting down the pump 26. As discussed previously with reference to the second mode of operation, which includes unintentional or unexpected interruption of the continuous heat transfer process, the fluid 25 drains passively from the heater 28, the fill tank 30 and the thermal processor 22, preferably into the rundown tank 24.

If the fluid will require rehydration before being used again to restart the apparatus, a second manner of shutting down the apparatus is used, which entails interrupting input of external energy to the heater 28 and stopping the pump, so that the fluid 25 in the heat transfer circulation loop passively drains to the rundown tank 24. Next, the procedure for hydrating a melted salt occupying the rundown tank 24 is performed, with the result that, at temperature equilibrium, the rundown tank fluid-containing portion 41 will be occupied by a hydrated salt solution which is liquid at ambient temperature.

As previously described, the procedure for hydrating a melted dehydrated salt in the rundown tank 24 entails interrupting the heat transfer circulation loop in the apparatus, establishing the preheating fluid circulation loop (the same loop that was used for preheating in the rundown tank), and then hydrating the salt. The approaches to hydrating the salt—more generally, mixing a melting-point-reducing additive into the salt—were discussed above and include the addition of a hydration fluid by means of such options as misting nozzles 60, an eductor 232, and a sparge tube 234.

The addition process continues until the freezing point of the circulating fluid 25 drops to a temperature low enough to permit circulation of the fluid 25 in the heat transfer circulation loop the next time the apparatus is to be operated.

Figure 7:
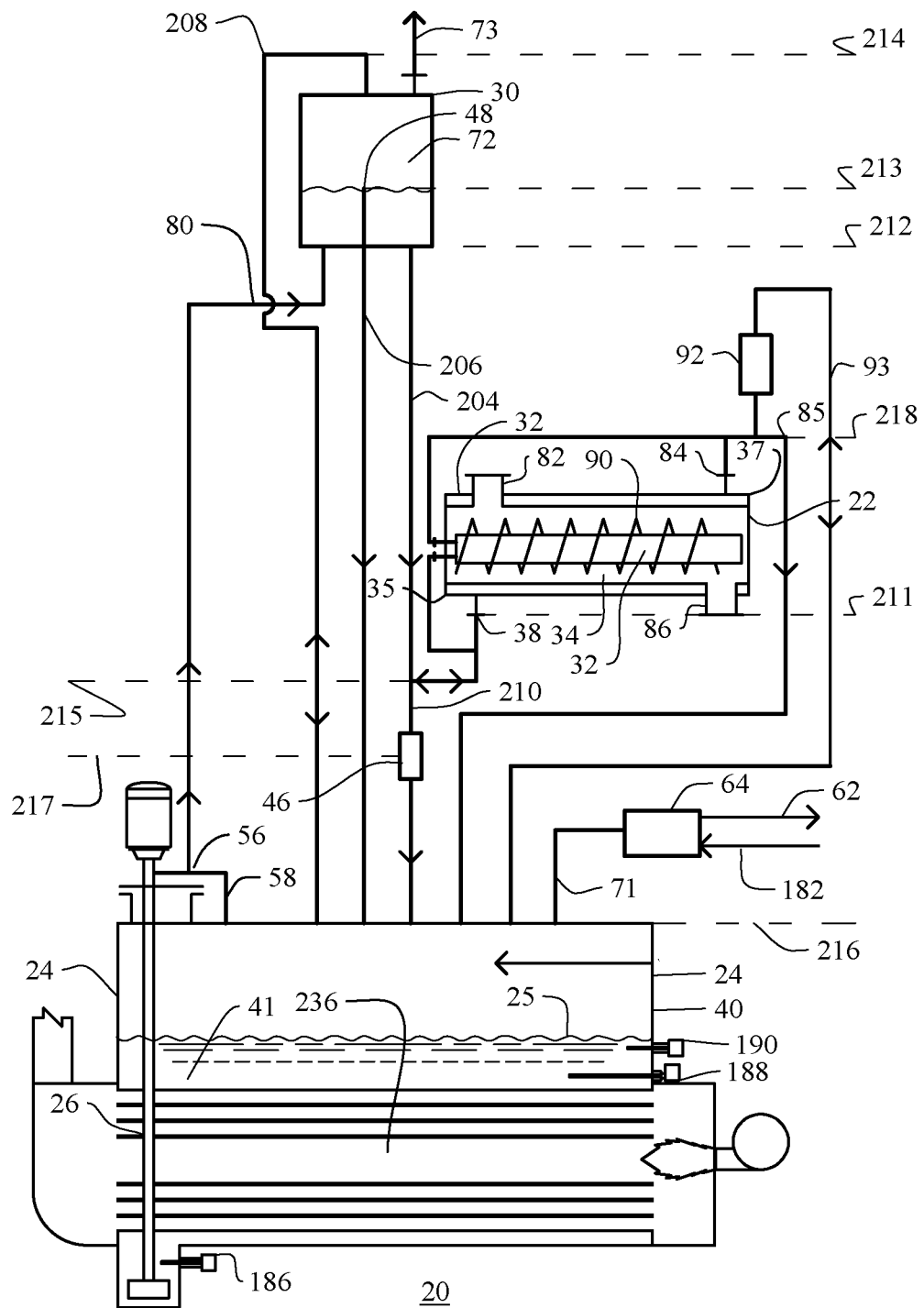
FIG. 7 is a schematic representation of AN EIGHTH EXEMPLARY EMBODIMENT thereof.

FIG. 7, a schematic representation of an EIGHTH EXEMPLARY EMBODIMENT of a molten-salt-indirectly heated screw-type thermal processing apparatus in accordance with the present invention, shown generally at 20, shows apparatus resembling the FIFTH exemplary embodiment, differing chiefly in that heating is performed substantially within the rundown tank 24, rather than by an external heater (see reference number 28 in previous figures). Externally-fed and exhausted transverse fire tubes 236 are located in the rundown tank fluid-containing portion 41.

In the aforementioned first mode of operation, continuous processing, the fire tubes 236 and pump 26 are activated and fluid 25 flows in the heat transfer circulation loop.

In the second mode, shutdown, the fire tubes 236 and pump 26 are deactivated and the fluid 25 drains passively to the rundown tank fluid-containing portion 41, which in this EIGHTH embodiment includes the fire tubes 236. Subsequent rehydration may be done if a hydrated salt has been dehydrated during operation and it is desired to store the salt in a hydrated form.

When the apparatus is to be started and the fluid 25 has solidified in the rundown tank fluid-containing portion 41 and in the heater, the solidified fluid 25 must be melted. The fire tubes 236 are activated. As soon as a temperature measured by the rundown tank temperature sensor 190 proximate the pump 26 indicates that a usable amount of material has melted, the pump 26 may safely be started. The bypass valve 56 is operated to interrupt the heat transfer circulation loop and to establish the pre preheating fluid circulation loop—in this EIGHTH exemplary embodiment, the fluid 25 enters the pump 26 from portions of the fire tubes 236 near the pump, exits the pump outlet 52 and flows via the pump output tube 55 back to the rundown tank 24 via the bypass branch tube 58. Eventually, the entire body of fluid 25 in the rundown tank 24 will melt. Alternatively, with the pump 26 in active, convection will eventually accomplish melting of the entire body of fluid 25.

When the apparatus is to be started and it is deemed necessary to hydrate the fluid 25 before circulating it to the thermal processor 22, the previously described steps for performing hydration are performed. With this EIGHTH exemplary embodiment, with melted salt is present in the rundown tank 24, the pump 26 is activate, the fire tubes 236 are deactivated, the rundown tank 24 is vented and a hydration fluid is mixed with the fluid 25. When the fluid temperature measured by the rundown tank temperature sensor 190 indicates a temperature consistent with hydration, or when the water content measured by the hydration measuring device 188 indicates a predetermined acceptable water content, the bypass valve 56 is operated to interrupt the preheating fluid circulation loop and establish the heat transfer circulation loop. Hydrated fluid 25 flows through the thermal processor 22. With the pump 26 and fire tubes 236 activated and the rundown tank 24 vented, the temperature of the fluid 25 increases gradually until the operating temperature is reached, at which point the apparatus is operating in the first mode.

A variety of hydration fluids are usable to lower the melting point of a heat transfer fluid such as a salt. These include water, steam, and hydrating solutions containing other salts or metal salts—lithium salts, for example.

The salt contemplated for an exemplary embodiment in accordance with the present invention can be operated at up to 800° F. without an inert blanket and at up to 1100° F. with a nitrogen gas blanket to protect it from atmospheric carbon dioxide. The salt is a solid below 300° F. to 500° F. and must be melted prior to circulation. The salt has an advantage of moving more heat per unit volume pumped than other heat transfer fluids.

The rundown tank 24 is located below the processor and all other equipment, allowing gravity draining. The rundown tank 24 can be fitted internally, externally or a combination of both, with fire tubes 236, electric heating, auxiliary heat transfer fluid tubing, thermal fluid jacketing, or steam coils to melt the salt and keep it molten for an extended time or even to be the heater. In substantially all applications, it is necessary to locate at least one heat source in or on the rundown tank 24. Such equipment may, indeed, be used to heat the fluid 25 in the system, such that, for some applications, a heater 28 located outside of the rundown tank 24 may be unnecessary. Advantageously, all pumps for moving the heat transfer fluid 25 through the apparatus can be located in the rundown tank 24, where they are immersed in the fluid 25 and where a reservoir of hotter, less viscous fluid 25 is likely to be available.

In a preferred embodiment of the apparatus in accordance with the present invention, a turbine pump or a centrifugal pump is employed. The drive motor is above the rundown tank 24. When the pump 26 stops, fluid 25 in the pump output tube 55 can drain backwards through the pump 26 into the rundown tank 24.

The inventors evaluated many molten salts for use in accordance with the present invention. Two salts commonly used in heat transfer applications, both sold by Coastal Chemical Company, are HITEC® brand eutectic salt mixture and HITEC SOLAR® brand salt mixture. HITEC SOLAR® is used mostly for heat storage, because it is less costly. Both of these two salt products have the same heat capacity for heat transfer: approximately 4.9 to 5.75 Btu/gallon/degree ° F. See, http://www.skyscrubber.com/MSR%20%20HITEC%20Heat%20Transfer%20Salt.pdf.

HITEC® brand heat transfer salt, formerly known as "HTS," is a eutectic mixture of potassium nitrate, sodium nitrite, and sodium nitrate. It is used as a heat transfer medium because of its low melting point of 288° F., its high heat transfer coefficient and its low cost. It can be used with carbon steel up to 850° F. and with 304SS above that temperature. Its viscosity at 350° F. is 10 cP and at 850° F. its viscosity is 1.4 cP. It is completely chemically stable up to 850° F. From 850° F. to 1000° F., it slowly degenerates over a period of years. At temperatures above 850° F., it should be under nitrogen gas padding to protect it from oxygen in the air, because oxygen will slowly oxidize the nitrite, producing a mixture with an undesirable elevated melting point. Its thermal conductivity coefficient is 0.33 to 0.35 Btu/(hr·ft·° F.), independent of temperature. Its specific heat is 0.32 to 0.35 Btu/lb/° F. Its density varies with temperature from ~16 lbs/gallon at ~450° F. with 5.6Btu/gal per ° F. to ~14 lbs/gallon at 1000° F. with 4.9 Btu/gal per ° F.

HITEC SOLAR® brand salt mixture is a higher service temperature salt. It is a two-part mixture of sodium nitrate and potassium nitrate salts. It is thermally equivalent to the eutectic salt but has a higher melting point and service temperature. It is useful up to 1100° F. Its specific heat is 0.37 Btu/lb/° F. Its melting point is 431° F. For practical purposes, the temperature needs to be 500-550° F. before the salt is run through the apparatus. For this reason, HITEC SOLAR® brand salt mixture is first hydrated, so that the melting point of the hydrate can allow the molten salt hydrate to be circulated at a much lower temperature of about 300° F. Its coefficient of thermal conductivity is 0.31 Btu/(hr·ft·° F.). Its heat transfer coefficient is 1164 Btu/h/ft$^2$ per ° F. Its viscosity is 2.1 cP. Its density is about 14 to 16 lbs/ft$^2$. Its specific heat is up to 5.75 Btu/gal/° F. See, http://citeseerx.ist.psu.edu/viewdoc/download?doi=10.1.1.175.2487&rep=rep1&type=pdf Other materials are often also present in the apparatus and, when they are, in accordance with the present invention often must be managed toward the object of effectively filling the structures of the apparatus with fluid, the object of effectively draining fluid 25 from those structures, the object of appropriately modulating pressures within those structures, one relative to another and collectively relative to ambient pressure, and the object of preserving desirable or necessary chemical or physical properties of the fluid 25 or fluid mixture. Notably in accordance with the present invention, where the apparatus is located on the surface of the Earth, the presence and pressure of the Earth's atmosphere and its various constituents are taken into account. Also notably in accordance with the present invention, when water is added to a salt heat-transfer material in the apparatus, water vapor may be generated and may require attention and management.

The fluid 25 or fluid mixture may change in properties other than temperature and viscosity. Such other properties of the fluid 25 or fluid mixture are important in operating the apparatus in accordance with the present invention. Notably in accordance with the present invention, the fluid 25 or fluid mixture expands when heated. In the case of at least one salt used as the heat-transfer fluid 25 in accordance with the present invention, the fluid 25 expands approximately 25% when heated from ambient temperature to the temperature at which continuous heating is accomplished in the apparatus. In accordance with the present invention, fluid expansion and contraction are accommodated toward the object of avoiding counterproductive pressure differences between the several structures of the apparatus and between those structures and the ambient-pressure environment, and toward the object of avoiding undesired fluid flow behavior. The management of the behavior of the heat-transfer fluid 25 and other materials in the apparatus is next described.

When a portion of the fluid 25 or fluid mixture expands as it is heated, it displaces any other material with which it shares a nearby portion of the apparatus. Either the volume of a portion of the apparatus must change to accommodate such displaced material, or such other material must contract, or such other material must move to another portion of the apparatus or exit the apparatus. Where the apparatus is constructed of substantially rigid vessels and tubes, as is often the case, expansion of the apparatus is impracticable. Where the fluid 25 or fluid mixture is not elastically compressible—usually such is the case with liquids and semi-solids—contraction of other portions of the fluid 25 or fluid mixture to accommodate displacement is not to be expected. Where a gas shares a portion of the apparatus with the fluid 25 or fluid mixture, the displacement due to expansion of the heated fluid 25 or fluid mixture may be accommodated by compression of the gas or by other volume-reducing phenomena such as condensation, deposition, adsorption or chemical reaction. However, in a given application, it may be that none of these accommodations is practicable or preferable. Then, a portion of the fluid 25 or fluid mixture or a portion of a material with which the fluid 25 or fluid mixture shares the apparatus must flow within the apparatus or exit the apparatus to accommodate the displacement due to expansion. In accordance with the present invention, the apparatus is equipped to relieve pressure and to allow flow of fluid 25 or fluid mixture or other materials within the apparatus and exit of same from the apparatus, as is now described.

With reference to FIG. 4, in an exemplary embodiment of the apparatus accordance with the present invention, fluid 25 or fluid mixture partially fills the rundown tank 24. Unless the rundown tank 24 is designed to withstand a partial vacuum relative to ambient pressure—often a design requirement that is undesirable and costly to meet—the balance of the volume of the rundown tank 24 (this volume is known as a headspace) is occupied by gas. As the fluid 25 or fluid mixture occupying any portion of the rundown tank 24 expands with increasing temperature, the volume available to this gas is reduced, pressurizing the gas. The rundown tank 24 is equipped with a relief valve 62 fluidly communicating with the rundown tank headspace portion 40. When pressure in the rundown tank headspace portion 40 exceeds ambient pressure by more than a predetermined tolerable value, the relief valve 62 opens and allows gas to escape from the rundown tank headspace portion 40. Conversely, when the fluid 25 or fluid mixture contracts or the rundown tank headspace portion 40 pressure falls below ambient pressure by more than a predetermined tolerable value, the relief valve 62 opens and allows gas to flow into the rundown tank headspace portion 40, reducing the pressure differential. A specific example of a gas which may be managed in this manner is air or preferably nitrogen, which is allowed to escape to the atmosphere or enter from the atmosphere through the relief valve 62 as needed to reduce the pressure differential.

Also with continued reference to FIG. 4, in another exemplary embodiment of the apparatus in accordance with the present invention, air is undesirable as the gas in the rundown tank headspace portion 40. This may be the case because, for example, a constituent of air is carbon dioxide, which reacts with a salt heat-transfer fluid to produce a carbonate which undesirably elevates the melting point of the salt. In such an embodiment, nitrogen may be employed as a padding gas to reduce pressure differentials while excluding air from the rundown tank headspace portion 40. Rather than a relief valve 62, the rundown tank 24 is equipped with a padding valve 64 connected to a nitrogen reservoir. Nitrogen is introduced to the rundown tank headspace portion 40 to displace air. When headspace pressure is high enough or low enough, relative to ambient pressure, to require relief, the padding valve 64 allows nitrogen to flow to the ambient environment or from the nitrogen reservoir as needed to reduce the pressure differential.

With continued reference to FIG. 4, in an exemplary embodiment of the apparatus in accordance with the present invention, at start-up, a gas occupies the apparatus but for the portion of the rundown tank 24 occupied by fluid. As the fluid 25 moves from the pump 26 into the pump output tube 55 and enters the heater 28, the fluid 25 displaces the gas from the pump output tube 55, forcing the gas through the heater 28 and toward the fill tank 30. As the fluid 25 passes through the heater 28, it expands, accelerating the rate of displacement of gas toward the fill tank 30. This displaced gas moves into the fill tank 30 and, in doing so, will build pressure if not relieved. Such gas pressure could oppose the flow of fluid 25 into and through the heater 28 and into the fill tank 30. To relieve this gas pressure, the fill tank headspace portion 72 should be vented and, more particularly, is vented by the gravity tube gas orifice 208 via the fill tank headspace connector 75 to the rundown tank headspace portion 40. Thus, gas back-pressure that might oppose flow of fluid 25 from the pump 26 through the heater 28 to the fill tank 30 is relieved. Conversely, at shut-down or during a cessation of operation, the fill tank headspace connector 75 conducts gas from the rundown tank headspace portion 40 to the fill tank headspace portion 72 to relieve any partial vacuum that could oppose passive drainage of fluid 25 from the fill tank 30 and heater 28 to the rundown tank 24. Pressure differentials between the rundown tank 24 and the are relieved via the relief-pad-depad valve 64 of the rundown tank 24.

During startup of the apparatus with a hydrated heat transfer fluid 25 being increased from ambient temperature to continuous heating temperature, water vapor leaves the fluid mixture and a substantial volume of steam evolves there and would pressurize the apparatus and oppose flow from the heater 28 to the fill tank 30 were it not relieved. To relieve steam pressure, the fill tank 30 is equipped with a fill tank steam vent 73, which is opened to allow the steam evolving from the fluid mixture to escape, relieving any excess steam that could oppose flow of fluid 25 from the heater 28 to the fill tank 30 or overpressurize the apparatus.

Likewise, during shutdown of the apparatus, if water is added to a salt heat-transfer fluid 25 to produce a mixture which circulates efficiently at temperatures between ambient temperature and continuous heating temperature, steam is generated. In an exemplary apparatus in accordance with the present invention, the rundown tank 24 is equipped with a set of misting nozzles 60 located in the rundown tank headspace portion 40. When planned, intentional shutdown is desired, the feeding of process material to the thermal processor 22 is interrupted and the process material in the thermal processor 22 is conveyed out of the thermal processor 22. The supply of outside energy to the heater 28 is interrupted. The bypass valve 56 is operated to interrupt the heat transfer circulation loop and to establish the preheating fluid circulation loop. The pump 26 is operated. Hydration fluid is supplied to the hydrator 60 in the rundown tank headspace portion 40 and is misted a fine spray onto the liquid salt heat-transfer fluid 25 in the rundown tank 24. An intended effect of misting the water onto the salt fluid 25 is to hydrate the salt, producing a mixture having low viscosity at temperatures between continuous heating temperature and ambient temperature. An additional effect of misting the hydration fluid onto the salt fluid 25 is the production of steam, whenever the salt is at a temperature high enough to boil the water in the rundown tank 24 under the existing conditions. This steam would overpressurize the rundown tank 24 were it not relieved. To prepare for the steam, the pad-depad valve 64 on the rundown tank headspace 40 is opened. With the pad-depad valve 64 open, the steam generated in the rundown tank 24 escapes through the pad-depad valve 64, avoiding over pressurization of the apparatus. In one exemplary embodiment, misting continues until the freezing point of the hydrated salt fluid mixture reaches 60° F. The pad-depad valve 64 will have been closed after steam no longer needs to escape.

As so far described, the heater 28, the fill tank 30 and the heat transfer fluid space 32 of the thermal processor 22 are described as passively drainable. The structures and interrelations rendering these structures and the apparatus overall passively drainable are now further described.

With continued reference to FIG. 4, in an exemplary embodiment of the apparatus in accordance with the present invention, the rundown tank 24 is configured to receive fluid 25 directly from the pump 26 at the pedestal 68 should the fluid 25 flow backward into the pump 26 from the heater 28. The rundown tank headspace portion 40 is fluidly connected with the gravity tube gas orifice 208 on the fill tank headspace portion 72 (as will be discussed shortly). The rundown tank 24 is configured to receive fluid 25 from the heat transfer fluid spaces 32 of the thermal processor 22 via the processor fluid outlet drain tube 85.

In an exemplary embodiment of the apparatus in accordance with the present invention, the rundown tank 24 has a sump 77 formed with a pedestal 68. The pump 26 is a centrifugal-type pedestal pump 26 resting on the pedestal 68 in the sump 77. A shaft connected to a motor located atop the rundown tank 24 drives the pump 26. The pump 26 has no seals or check-valves capable of halting backward flow of material from the heater 28 through the pump 26 into the rundown tank 24. The openness of the pump 26 to such backward flow advantageously allows fluid 25 draining from the heater 28 to flow quickly into the rundown tank 24, facilitating passive drainage of the apparatus.

In an exemplary embodiment of the apparatus in accordance with the present invention, the heater 28 is formed to provide a continuously inclined fluid flow path from the heater inlet 54 to the heater outlet 78. The pump output tube 55 connects the heater inlet 54 to the pump outlet 52. The heater output tube 80 connects the heater outlet 78 to the fill tank bottom portion 36. Thus, the fill tank 30 and heater 28 are passively drainable to the rundown tank 24 via the pump 26 under the influence of gravity.

With reference to FIGS. 3-7, the fill tank 30 also is equipped with a stem pipe 48 opening upwardly at a high portion of the fill tank 30 and communicating with the fill tank headspace portion 72. The stem pipe 48 is connected to the rundown tank headspace portion 40. Fluid 25 will not flow from the fill tank 30 into the stem pipe 48 unless the level of fluid 25 in the fill tank 30 exceeds the level at which the stem pipe 48 opens. Thus, the level at which the stem pipe 48 opens sets the maximum depth of fluid 25 in the fill tank 30 and, by doing so, sets an upper limit on the range of pressures the fluid 25 flowing out of the low portion of the fill tank 30 will exert when received at the thermal processor 22. As long as the level of fluid 25 in the fill tank 30 is above the level of the gravity tube 204, fluid 25 will tend to flow out of the fill tank 30, through the gravity tube 204, and through both the restrictor 46 and the thermal processor 22 to the rundown tank 24. When the pump 26 ceases to drive fluid 25 up through the heater 28, fluid 25 flows back rapidly from the fill tank bottom portion 36, through the heater output tube 80, through the heater 28 and pump output tube 55 to the rundown tank 24 and, simultaneously, more slowly through the gravity tube 204 through the restrictor 46 to the rundown tank 24.

With continued reference to FIG. 4, the thermal processor 22 is now discussed, first with attention to how it is interrelated with the fill tank 30, the restrictor 46 and the rundown tank 24; second, with attention to how it is formed and configured to be completely fillable and passively drainable; third, with attention to how the thermal processor 22, restrictor 46 and fill tank 30 cooperate to accomplish the important object of managing fluid 25 flow during startup of the apparatus.

The thermal processor 22 has at least one thermal processor low portion 35 with at least one heat transfer fluid inlet 38 and at least one thermal processor high portion 37 with at least one heat transfer fluid outlet 84. The thermal processor 22 has at least one heat transfer fluid space 32 fluidly communicating with the transfer fluid inlet 38 and transfer fluid outlet 84, and has a process space 34 with process material inlet 82 proximate the thermal processor low portion and process material outlet 86 proximate the thermal processor high portion. In some embodiments, the heat transfer fluid space 32 is inclined. A conveyor 90 is disposed within the process space 34 and is driven by a mover associated with the thermal processor 22. When the thermal processor 22 is at a processing temperature, process material is received at the process material inlet 82. The conveyor 90 is activated and urges the process material toward the process material outlet 86.

The thermal processor 22 may require the input of a substantial amount of heat in order to reach operating temperature. Thus, in operating the apparatus in accordance with the present invention, it is observed that during startup the rise in temperature of the fluid 25 in the heat transfer fluid space 32 of the thermal processor 22 lags the rise in temperature of the fluid 25 flowing through the restrictor 46 to the rundown tank headspace portion 40. Thus, the fluid 25 in the heat transfer fluid space 32, being cooler, is more viscous and flows more slowly. Consequently, during startup, the total flow of fluid 25 out of the low portion of the fill tank 30 is reduced. However, there might not be any mechanism in place to adjust the output of the pump 26 and heater 28 to account for this reduced flow. With the pump 26 and heater 28 delivering fluid 25 at a rate higher than the restrictor 46 and the thermal processor 22 together can accept fluid, the fluid 25 begins to accumulate in the fill tank 30 (e.g., FOURTH exemplary embodiment) or gravity tube 204 (e.g., THIRD exemplary embodiment). As the level of the fluid 25 in the fill tank 30 rises, the fluid 25 pressure increases at the restrictor 46 and at the heat transfer fluid inlet 38, increasing the rate of flow through these two structures somewhat. This increase of flow rate might suffice to manage the excess.

If the flow from the heater 28 into the fill tank 30 (or gravity tube 204, THIRD exemplary embodiment) continues to exceed the flow out from the fill tank 30, the level of fluid 25 in the fill tank 30 rises until fluid 25 begins to flow through the stem pipe 48 (or gravity tube upper drain 206, THIRD exemplary embodiment) to the rundown tank headspace portion 40, limiting any further increase in pressure at the restrictor 46 and the heat transfer fluid inlets 38, even if the pump 26 and heater 28 continue to deliver fluid 25 to the fill tank 30 (or gravity tube 204) at an excessive rate.

As the thermal processor 22 warms up, the fluid 25 in the transfer fluid 25 flows more easily and equilibrium may be achieved with the fluid level stabilized at a level intermediate that of the low portion of the fill tank 30 and that of the stem pipe 48 orifice. In any event, the restrictor 46 and thermal processor 22 are never exposed to a fluid pressure greater than can be exerted by a column of fluid 25 extending between the height of the heat transfer fluid 25 inlet and the height of the stem pipe 48 in the fill tank 30 (or the height at which the gravity tube 204 fluidly communicates with the gravity tube upper drain 206).

In accordance with the present invention, when molten salt is used as a heat transfer fluid, materials for surfaces in contact with the salt are selected based on temperature tolerance and the ability to withstand corrosion. Carbon steel is usable for temperatures up to 800° F., 304 SS for temperatures up to 1000° F., and 347, among other SS for temperatures above 1000° F.

Piping and vessels are insulated to conserve heat.

The rundown tank 24 is at the lowest elevation in the system. The highest fill level of the rundown tank 24 is at a lower elevation than the thermal processor 22, fill tank 30 and heater 28. The rundown tank 24 has sufficient capacity to hold 100% of the volume of heat transfer fluid 25 contained by the apparatus, plus an additional 30% for expansion and an additional 20% for safety. It is common for a preferred embodiment of the apparatus in accordance with the present invention to have a minimum of a 150 gallon rundown tank 24 with an approximate diameter of 36 inches and an approximate length of 48" with a sump 77 projecting approximately 12 inches downward.

The pump 26 for a preferred embodiment of the apparatus in accordance with the present invention is a pump designed for the intended temperature range. The pump 26 has a pump curve specific to the required pressure determined by the head pressure for a given installation, i.e., pressure sufficient to deliver fluid 25 through the heater 28 to the fill tank 30 at a sufficient rate to keep the fill tank 30 at a desired fill level. A preferred pump configuration uses a vertical shaft pit pump without a seal. The drive is above the rundown tank 24.

The fill tank bottom portion 36 is at an elevation higher than the elevation of the heat transfer fluid inlet 38 of the thermal processor 22 and higher than the elevation of the rundown tank 24. The fill tank 30 has a volume of approximately 5% of the volume of heat transfer fluid 25 needed to run the apparatus during operation. In a preferred embodiment, the tank has a volume of about 6 gallons, although a much larger fill tank 30 may be more practical in some circumstances.

In a preferred embodiment of the apparatus in accordance with the present invention, the thermal processor 22 has a length of 26 feet, a width of 4 feet, a height of 4 feet, with conveying screws 20 feet in length and 14 inches in diameter. Material thicknesses are approximately 5/16 inch.

In a preferred embodiment of the apparatus in accordance with the present invention, the heater 28 is about 4 feet in diameter and 7 feet in height.

In some embodiments, the rundown tank 24 has a rupture disk (see 192 in FIG. 4) for safe rapid release of vapor in the event of gross overpressurization.

The tubing in which the heat transfer fluid 25 circulates is constructed of materials capable of tolerating the anticipated temperatures, pressures and chemical conditions. 347 SS is a preferred material for high temperatures and can be used when, as is described herein, the use of a pressure boundary material is not required for safety or certification.

The rundown tank 24 has capacity for a volume of the heat transfer fluid 25 sufficient to operate the apparatus, capacity for expansion of the fluid 25 volume, and capacity for a volume of gas above the fluid 25 volume. With reference to FIG. 4, in the FIFTH exemplary embodiment, when the rundown tank 24 is occupied by a volume of fluid, it disposes the fluid volume so as to provide a fluid upper surface 240 at a fluid upper surface height below the top of the rundown tank 24, i.e., allowing vacant space accounted for by the rundown tank headspace portion 40. Capacity for the volume of fluid 25 (i.e., liquefied heat transfer fluid) sufficient to operate the apparatus is important, because the entire volume of thermal transfer fluid 25 in the apparatus should be able to drain into the rundown tank 24 when it is not being heated and circulated, thereby avoiding retention of fluid 25 in the thermal processor 22 or elsewhere outside the rundown tank 24 when temperatures fall below the melting point of the fluid. Capacity for expansion of the fluid 25 is important, because the fluid 25 expands up to 25% over the range of temperatures at which it is used. Capacity for a volume of gas above the fluid 25 is important for accommodating the expansion of the fluid 25 during heating, for accommodating the steam generated both during hydration and during dehydration, and for equalizing pressure differentials relative to the transfer fluid space 32 of the thermal processor 22 and the fill tank headspace 72. The displacement of a gas is important in managing a liquid or solid which is in contact with the gas while managing the pressure within a portion of the apparatus relative to the environment. A fluid upper surface 240 of the volume of fluid 25 is important, because it is preferable for the pump 26 to ingest the fluid 25 at a location below the fluid upper surface 240 and because the fluid upper surface 240 creates a liquid-gas interface at which material and heat are transferrable.

With reference to FIG. 4 and the FIFTH exemplary embodiment, the gravity tube 204 accepts heat transfer fluid 25 from the heater outlet 78 and feeds the fluid 25 to the processor fluid inlet 38 under the influence of gravity at a pressure determined largely by the height differential between the first height 211 and the second height 212, and not determined by the pressure or flow rate of the pump 26. Passively limiting pressure to within a predetermined range in this manner is advantageous for its simplicity and reliability. The gravity tube upper drain 206 receives the fluid 25 flow, if any, that exceeds the fluid 25 flow entering the gravity tube 204 and flowing toward the processor fluid 25 inlet 38. The gravity tube gas orifice 208 admits gas to the gravity tube 204 at times when a partial vacuum might develop in the gravity tube 204, e.g., when fluid 25 is entering the gravity tube 204 from the heater outlet 78 more slowly than it is flowing into the gravity tube 204 toward the processor fluid 25 inlet 38. Conversely, the gravity tube gas orifice 208 allows gas to escape the gravity tube 204 when a vapor lock might develop there, e.g., when fluid 25 is entering the gravity tube 204 from the heater outlet 78 more rapidly than it is flowing into the gravity tube 204 toward the processor fluid 25 inlet 38. This arrangement facilitates and assures passive drainage when the pump 26 stops.

Because the processor fluid 25 outlet 84, the gravity tube 204 and the gravity tube upper drain 206 fluidly communicate with the rundown tank 24, fluid 25 from these three paths converges and can again be circulated to the gravity tube 204 via the heater 28. Because the gravity tube gas orifice 208 and the vacuum breaker connector tube 93 fluidly communicate with the rundown tank 24, gas is transferrable among the rundown tank 24, the thermal processor 22, and the gravity tube 204 (portion thereof proximate heater output tube 80) or fill tank headspace portion 72. Gas transfer is important, because the entry of thermal transfer fluid 25 into any one of these three structures may be facilitated by allowing the gas that the fluid 25 displaces to pass to another of these three structures. Additionally, temperature changes often produce expansion or contraction of the heat transfer fluid 25 or of a gas, requiring gas transfer to avoid creating a troublesome or dangerous local overpressure or partial vacuum.

In an exemplary embodiment, the first height 211 and the second height 212 are selected such that a column of the fluid 25 extending vertically from the first height 211 to the second height 212 exerts pressure at the processor fluid 25 inlet 38 no greater than 14.9 PS IG. When pressures are kept at or below this limit, structural loads and rupture hazards are mitigated and engineering standards calling for costly ASME pressure boundary materials and construction are not implicated. As an additional benefit, 347 SS, which is not an ASME-recognized pressure boundary material, is preferred in the construction of some embodiments of the apparatus in accordance with the present invention.

In an exemplary embodiment, the rundown tank 24 is equipped to vent a gas to the ambient environment and to receive a gas from a source selected from among the ambient environment of the apparatus and a padding gas supply tube 182. This arrangement, commonly a pad-depad valve 64 fluidly connected with a supply of inert padding gas such as nitrogen, allows overpressure in the rundown tank 24 to be vented to the atmosphere and compensates for under pressure in the rundown tank 24 by admitting inert gas to the rundown tank headspace portion 40.

The fill tank 30 (or the fluid communication of the gravity tube 204 with the heater output tube) is located uppermost in the apparatus. Heat transfer fluid 25 passing from the heater outlet 78 to the fill tank bottom portion 36 at the second height 212 is free to enter the gravity tube 204 and flow downward toward the processor fluid inlets 38. Heat transfer fluid 25 which has accumulated in the fill tank 30 and has risen to the third height 213 in the fill tank headspace portion 72 (or in the gravity tube 204, see THIRD exemplary embodiment) enters the stem pipe 48 ((e.g., FOURTH exemplary embodiment) and flows down the gravity tube upper drain 206 toward the rundown tank 24.

With reference to FIG. 4, in an exemplary embodiment, the rundown tank 24 disposes the fluid volume so as to provide a fluid upper surface 240 at least a portion of which is accessible and suitable for hydration. The rundown tank 24 has hydration water-dispensing nozzles 60 and a rundown tank headspace vent 71. Preferably, the hydration water-dispensing nozzles 60 are configured to deposit a water mist gently onto the fluid upper surface 240 without disrupting it. The fluid upper surface 240 should be large enough to permit the hydration nozzles 60 to efficiently add water to a body of dehydrated salt in the rundown tank 24. It is usually undesirable to cause a molten salt to erupt and splatter in the rundown tank 24. Therefore, when hydrating hot molten salt, the hydration water nozzles 60 should apply water in such a manner that the water absorbs heat from the hot salt, the water and the salt combine to form hydrated salt, and yet the water is never injected into the salt in a manner that could cause water to flash beneath the fluid upper surface 240. Preferably, a fine mist of water is injected above the salt and gently and uniformly settles onto the fluid upper surface 240, whereupon some of the water vaporizes and some of the water combines with salt. Initially, flash steam may require an efficient path to the environment, such as may be provided by an amply dimensioned pad-depad valve 64 on the rundown tank headspace portion 40. Gradually, as the volume of hot dehydrated salt is replaced by a volume of cooler hydrated salt, the temperature and pressure in the rundown tank 24 will decrease, at which time padding gas may be admitted through the pad-depad valve 64 to compensate for any underpressure as the remaining steam condenses.

In an exemplary embodiment, the rundown tank 24 is equipped to heat the fluid 25 and the pump 26 and the rundown tank 24 are configured selectively to circulate the fluid 25 between the pump 26 and the rundown tank 24. When solidified salt occupies the rundown tank 24, the salt must be liquefied in order for it to circulate. Whether cold solidified salt is warmed in order to liquefy it, or it is hydrated in order to produce a hydrated salt liquid (which is later dehydrated), it is preferable initially to circulate the salt in a short loop including the rundown tank 24 and the pump 26. In one embodiment, see FIG. 4, a bypass branch 58 fluidly connects the pump 26 output to the rundown tank 24 at a level above the fluid-gas boundary of the fluid upper surface 240, allowing fluid 25 to flow over and through the solid salt toward the pump 26 in the rundown tank 24. During this period, it may be preferable to equip the rundown tank 24 with a heating element 184 which is activated to begin liquefying the salt. The pump 26 may be positioned in a sump 77 in the rundown tank 24, in which case a heat trace 66 is installed on the sump 77 and is activated at this time. After a sufficient amount of salt is liquefied, the heat trace 66 or heating element 184 is deactivated and the fluid 25 is routed to the heater 28 for circulation through the apparatus.

In the exemplary embodiments of FIGS. 2-7, for example, a restrictor 46 is located in the gravity tube lower drain 210 at a seventh height 217 below the first height 211 and above the six height. The restrictor 46 allows a minor portion, such as 2-4%, of the fluid 25 flowing into the gravity tube 204 to flow to the rundown tank 24, while a major portion flows to the thermal processor 22 fluid 25 inlet. While the pump 26 is active, the major portion of the fluid 25 flow serves to transfer heat to the thermal processor 22, while the minor portion of the fluid 25 flow serves to keep the gravity tube 204 hot so that the gravity tube 204 remains capable of carrying fluid 25 to the rundown tank 24. When the pump 26 is inactive or for any other reason fluid 25 is no longer being delivered at sufficient rate to cause it to flow through the thermal processor 22, the fluid 25 is free to flow out of the thermal processor 22 through the processor fluid 25 inlet 38, back to the gravity tube 204, and through the restrictor 46 214 to the rundown tank 24.

In an exemplary embodiment, the heat transfer fluid outlet 84 of the thermal processor 22 is located above the first height 211. When the pump 26 stops, fluid 25 in the thermal processor 22 flows out through the processor fluid 25 inlet 38 and ultimately to the rundown tank 24, while fluid 25 which has left via the processor fluid 25 outlet 84 also flows to the rundown tank 24.

With reference to FIG. 4, an exemplary method of operating a fluid-heated indirect thermal processing apparatus in accordance with the present invention is described for use with a salt having a melting point below 300° F. This method is carried out in a closed loop thermal heating system with nitrogen padding with equipment designed to accommodate differential thermal expansion of the housing and screw conveyor. As its thermal fluid 25 heat transfer fluid, this method uses a molten salt. This exemplary method is accomplished without hydrating the salt. As previously described with reference to the apparatus of FIG. 4, a rundown tank 24 is located at a low point of the apparatus to facilitate gravity draining of the thermal fluid 25 into the rundown tank 24 during shutdown. The rundown tank headspace portion 40 is nitrogen padded—i.e., nitrogen blanketed—to protect the thermal fluid 25—in this exemplary method, a molten salt—from the atmosphere and to balance the headspace pressures (in the rundown tank 24, thermal processor 22, heater 28 and fill tank 30) throughout the apparatus. The rundown tank 24 serves as a container for the inventory of thermal fluid 25, an expansion tank as the thermal fluid 25 heats, as a receiver for the return flow from the thermal processor 22, as a common headspace for pressure compensation, as a sump for drain-down at time of shutdown or at time of plant failure such as a power failure and as a surface for hydration/dehydration when that is advisable. The pad-depad valve 64 releases air or padding gas (nitrogen, in this exemplary method) from the system as pressure increases due to expansion of the molten salt when heated. During shutdown when the molten salt cools/solidifies, the pad-depad valve 64 admits nitrogen from a nitrogen supply, filling the rundown tank headspace 40 with nitrogen. The rundown tank 24 contains a pump 26 which is submerged in the rundown tank 24 and is located on a pedestal 68 in a sump 77 located at a low point of the rundown tank 24. The pump 26 is employed to circulate the thermal fluid 25 through the apparatus. The sump 77 has an electrical heat trace 66. Alternately, preferably additionally, the rundown tank 24 is equipped with submersion heating elements 184.

During startup, if the salt is solidified in the rundown tank 24, the heat trace 66 or heating elements 184 are activated to melt the salt around the pump 26 and the heating elements 184 melt the salt in the rundown tank 24. A flow path is created in the rundown tank 24 into the sump 77. During a cold startup, the path from the pump outlet 52 to the heater inlet 54 is closed and the bypass branch tube 58 from the pump output back to the rundown tank 24 is open. Once the salt is heated to melting around the pump 26, as detected by a temperature sensor in the sump 77, the pump motor can be started. The pump motor can be variable frequency controlled and typically is operated at a low flow rate, with the melting salt circulating from the sump 77, through the pump 26, through the bypass branch 58, into the rundown tank headspace portion 40, and down through the flow paths created by the heating elements 184, where it returns to the sump 77 for recirculation. When the salt in the rundown tank 24 is fully melted, as detected by a temperature sensor in the rundown tank 24, the path from the pump outlet 52 to the heater inlet 54 is opened and the bypass branch 58 is closed.

Molten salt rises from the pump outlet 52 to the heater inlet 54 and into the bottom of the thermal fluid heater 28. The heater 28 preferably is formed to provide a continuously inclined fluid flow path from the heater inlet 54 to the heater outlet 78 without valves in the thermal fluid loop. Valves can be used, but in this method are not required. The thermal fluid characteristics of density and viscosity change significantly as the thermal fluid 25 is heated. The density and viscosity of molten salt change dramatically with temperature. Therefore, for a particular pump 26, the flow rate changes at different operating temperatures. In the embodiment utilized for this method, the flow rate is always more than the required by the thermal processor 22. Having reached a desired temperature in the heater 28, the molten salt exits through the heater outlet 78 located at the top of the heater 28 and flows into the fill tank 30.

The fill tank 30 is located at the highest point in the apparatus and sets the head pressure on the fluid flow into the thermal processor 22. As the fill tank 30 fills with molten salt, the fill tank headspace connector 75 allows the air or nitrogen inside the fill tank 30 to be displaced into the rundown tank headspace portion 40. The salt exits the fill tank bottom portion 36 through the fill tank gravity flow tube 42 and then through the thermal processor 22 branch tube 44 to the thermal processor 22. As mentioned previously, the flow rate of molten salt from the heater 28 exceeds the flow requirements of the thermal processor 22. Consequently, the level of the molten salt in the fill tank 30 rises. A stem pipe 48 inside the fill tank 30 sets the maximum fill level of the tank. The balance of excess flow discharges into the rundown tank headspace portion 40 after entering the stem pipe 48.

The thermal processor 22 in this embodiment is a heat exchanger that transfers heat from the thermal fluid 25 to the feed passing through the thermal processor 22. The thermal processor 22 can be one of several different types. In the thermal processor 22s used in accordance with this exemplary method, the supply of heated thermal fluid 25 enters the thermal processor 22 at a low portion thereof and generally flows up through the flow paths of the processor 22 and exits a high portion. Thus, if the supply of thermal fluid 25 is cut off, the flow reverses under the influence of gravity and exits the processor 22 at the low portion. The thermal fluid 25 is allowed to gravity drain back to the rundown tank 24 when the pump 26 shuts off. With the pump 26 operating, thermal fluid 25 exists the heat transfer fluid outlet 84 and flows to a vacuum breaker 92.

The vacuum breaker connector tube 93 fluidly connects the vacuum breaker 92 to the rundown tank headspace portion 40. This prevents air-locking on startup or (vacuum-locking) during drain down by venting the gases in the flow paths of the thermal processor 22 to the rundown tank headspace portion 40. Thermal fluid 25 returns to the rundown tank 24 from the vacuum breaker 92 and is recirculated by the pump 26.

Another feature of this apparatus is the ability to passively limit the pressure on the fluid 25 to a few psi and therefore not requiring the heat exchanger or any of the tanks to be an ASME pressure vessel. This is particularly important in extremely high temperature applications where the use of molten salt as the heat exchange media is employed. The preferred metallurgy for the salt, a commercial heat transfer salt, at 1100° F. is 347SS, which is not an ASME-recognized pressure boundary material.

An important design feature of all piping and equipment for the use of molten salt as the heat transfer fluid 25 is the gravity draining during shutdown and when the pump 26 stops. Because the two most common molten salts used for heat transfer fluids, HITEC® and SOLAR SALT®, freeze at 288° F. and 448° F. respectively, it is necessary to drain all of the equipment and piping dry of molten salt on shutdown or power failure. During a shutdown of the system, the molten salt drains by gravity down to the rundown tank 24. Molten salt gravity drains from the fill tank 30, both back to the heater 28 (and from there back through the pump 26) and also through the gravity tube 204, to the rundown tank 24. As the lines drain, the vent line to the rundown tank headspace portion 40 supplies nitrogen from the padding system to fill the void created by the draining thermal fluid. The flow from the heater 28 drains down through the pump 26 to the rundown tank 24. The transfer fluid spaces 32 of the thermal processor 22 are self-draining to the rundown tank 24. The apparatus passively drains when the pump 26 is not operating.

Occupying relative high points of the apparatus are the fluid communication of the gravity tube 204 with the heater output tube 80, gravity tube upper drain 206 and gravity tube gas orifice 208 (see FIG. 2), the fill tank 30 (FIGS. 3-7), and the vacuum breaker 92 (FIGS. 2-7). The gravity tube gas orifice 208 and the vacuum breaker connector tube 93 gravity tube lower drain 210 are both fluidly connected to the rundown tank headspace portion 40. This is important, because on shutdown, all the heat transfer fluid flow paths empty and fill with air or padding gas, which must be displaced at startup.

For molten salts with melting temperatures greater than 300° F., the molten salt must be hydrated during startup to avoid thermally shocking the apparatus. The two major HTF salts, HITEC® and SOLAR SALT®, melt at 288° F. and 448° F. respectively. Damage to the equipment could occur if hot (>300° F.) molten salt were circulated through a cold system. It is necessary to warm the system gradually. In the event that a salt is used with a melt temperature above 300° F., the salt must be hydrated during each startup and dehydrated during each shutdown. The process of hydrating the salt involves adding water to the salt as it cools until it becomes a saturated salt solution that remains in the liquid state. During startup the water is boiled out of the solution.

The primary differences between this exemplary method and the method without hydration are the addition of a salt hydration system and a vent to remove the steam during dehydration. All other aspects are fundamentally the same and should be inferred from the previous description of a method without hydration. The following method will be employed during each startup and shutdown to hydrate and dehydrate the salt solution.

Hydrated salt can be already liquid at ambient temperature. It may be only partially hydrated, which lowers the melting point, in which case only a slight heating can easily melt the solid. To start the apparatus with liquid hydrated salt, the pump 26 is turned on and hydrated salt is circulated through the system. The heater 28 is activated and the salt is heated at ramp rate of approximately 5° F. per minute to 215° F.-220° F. At this temperature, the salt will begin to dehydrate, releasing evaporated water. Depending on the volume of molten salt in the system, the temperature can be held at 220° F. until the rate of steam release begins to subside, or a new ramp rate of 2° F. per min can be imposed immediately after reaching 220° F. The steam in the fill tank 30 exits through a rundown tank headspace vent 71 that is open during the startup. Steam from the thermal processor 22 vents to the rundown tank 24 and vents to the rundown tank headspace vent 71, out to the environment. At 480° F., the molten salt eutectic becomes anhydrous and the heating ramp rate can be set to 5° F. per minute until the final desired temperature has been reached. The Solar salt requires more than 600F for full dehydration.

During shutdown, the salt must be hydrated if solidification is to be prevented when it cools. At least partial hydration is required if circulation of the salt is to begin after melting without first having to heat the salt to too high a temperature to begin circulation without unacceptable thermal shock. The heater 28 is deactivated and circulation of the salt is continued for hydration during shut down. Meanwhile, feed is emptied from the process space 34 of the processor 22. When the molten salt has cooled to near its melting temperature, the pad-depad valve 64 is opened to the atmosphere for venting of water vapor. Hydration fluid is misted onto the top of the melted salt in the rundown tank 24 via the water misting nozzles 60. The salt is hydrated until its freezing point drops preferably to below 60° F. Once the salt has become fully hydrated, the system functions in the manner of the method described above without hydration, except that the rundown tank remains vented for dehydration up to at least 600° F.; beginning at that temperature, the system is operated as a blanketed closed system.

To start the apparatus with solidified salt, a portion of the salt around the pump must be melted. The melting salt expands. Provision is made for the electric or other heat sources to melt a vertical passage to the surface of the solidified salt for the expanding liquid. Once a sufficient volume of liquid is melted the pump can be started. The rundown tank 24 is an insulated tank of sufficient volume to contain the whole volume of salt in the apparatus with room for expansion on heating and an adequate surface area for hydration. The rundown tank headspace portion 40 is connected to all headspaces (fill tank 30, heater 28, and processor 22) within the molten salt loop to maintain a common pressure and inert atmosphere and to break any siphon effects. The rundown tank 24 includes a sump 77 with a heat trace 66 which the pump 26 sits in. The pump 26 is VFD driven, capable of sufficient pressure to circulate the salt through the system. In the event the salt solidifies, the heat trace 66 melts the salt around the pump 26 and the heating elements 184 melt the salt in the rundown tank 24. Alternatively, steam or thermal oil could be circulated through tubes in the rundown tank 24 as a means of heating the salt.

As the salt melts, the heating elements 184 provide vertical and horizontal melt channels communicating with the sump 77 so that molten salt can flow up to the surface of the salt in the rundown tank 24 and back to the pump 26. The pump 26 is started with the bypass valve 56 operated so that the bypass branch 58 open. The molten salt is recirculated into the rundown tank 24. The molten salt continuously expands the molten volume by convection until the whole mass of salt in the rundown tank 24 is melted. Once the salt is sufficiently melted, as detected by a temperature sensor, with the mass reaching approximately 480° F., the hydration of the salt can begin. The misting nozzles 60 are activated. The hot molten salt is circulated in the rundown tank 24 while hydration fluid is added. Some of the hydration fluid is absorbed by the salt, while some vaporizes. Steam vents through the pad-depad valve 64 to the atmosphere. A rupture disk 192 protects the rundown tank 24 from any gross over pressurization. As the temperature of the salt cools due to the addition of water, the salt absorbs water more rapidly. Once the salt is adequately hydrated by being a liquid at a safe temperature for starting circulation without unacceptable thermal shock to the thermal processor 22, the hydration fluid supply is turned off. At this point, a startup with hydrated salt can commence.

With reference to FIG. 1, a FIRST exemplary method of operating a molten-salt-indirectly heated screw-type thermal processor in accordance with the present invention is carried out with a molten-salt-indirectly heated screw-type thermal processor 22 which has an operating heat transfer fluid 25 temperature range, an operating heat transfer fluid 25 flow rate range and an operating heat transfer fluid 25 pressure range. A heater, and a rundown tank are operatively connected to the thermal processor 22 as previously discussed.

With continued reference to FIG. 1, a heat transfer fluid 25 is provided. The fluid 25 is capable of conveying heat from the heater 28 to the thermal processor 22 at a temperature within the processor's operating heat transfer fluid 25 temperature range while flowing into the thermal processor 22 at a heat transfer fluid 25 flow rate within the processor's operating heat transfer fluid 25 flow rate range at a pressure within the processor's operating heat transfer fluid 25 pressure range. The volume of fluid 25 that is provided is at least sufficient to operate with the heater 28 and thermal processor 22. The heater 28 is capable of heating the heat transfer fluid 25 sufficiently at the aforementioned flow rate and temperature. The rundown tank 24 has capacity more than sufficient to contain all of the heat transfer fluid 25 that is added. The pump 26 is activated and delivers the heat transfer fluid 25 from the heater 28 to the thermal processor 22 at the temperature, the flow rate and the pressure while delivering the heat transfer fluid 25 from the thermal processor 22 to the heater. When it is desired to cease processing, the pump 26 is stopped. The heat transfer fluid 25 flows passively into in the rundown tank 24.

With reference to FIG. 4, a SECOND exemplary method of operating a molten-salt-indirectly heated screw-type thermal processor in accordance with the present invention is carried out by using one or more heaters to produce the heat transfer fluid 25 by melting a solid. A solid material such as a salt is located in the rundown tank 24. A small portion of the material is heated until it melts, making fluid 25 available to the pump. The heat transfer 25 circulation loop is interrupted. The preheating circulation loop is established. The pump 26 is activated. When a rundown tank temperature sensor indicates that the body of salt in the rundown tank 24 has melted, the preheating circulation loop is interrupted and the processing circulation loop is established.

It is often advantageous to begin circulating a fully hydrated salt in the heat transfer 25 circulation loop and at least partially dehydrate the salt while circulating it. With reference to FIG. 4, a THIRD exemplary method of operating a molten-salt-indirectly heated screw-type thermal processor in accordance with the present invention is carried out with a heat transfer fluid 25 comprising a hydrating fluid. Such a method is useful when a cold thermal processor must be protected from sudden exposure to a very hot heat transfer fluid. With the heat transfer 25 circulation loop established, the pump 26 activated and the rundown tank 24 vented, the heater 28 is activated, gradually warming and dehydrating the fluid 25 as the fluid 25 gradually warms the thermal processor 22. Simultaneously dehydrating the salt and delivering the salt to the thermal processor 22 has the advantage of gradual change of processor temperature and gradual removal of water (vented as steam). A thermal processor 22 has a predetermined maximum tolerable rate of temperature increase, the step of dehydrating is performed slowly enough that the thermal processor 22 is warmed at a rate no greater than that maximum tolerable rate.

With reference to FIG. 4, a FOURTH exemplary method of operating a molten-salt-indirectly heated screw-type thermal processor in accordance with the present invention entails making the melting-point-reduced material, or hydrated salt, as the case may be, on-site in the rundown tank 24. A body of molten salt is provided in the rundown tank 24, melting the salt in accordance with the aforementioned SECOND exemplary method if necessary. With the heat transfer 25 circulation loop interrupted, the preheating circulation loop established, the rundown tank 24 vented and the pump 26 activated, a melting-point-altering material selected from among water, a hydrating fluid, and steam is added to the fluid. When a rundown tank temperature sensor indicates that the body of salt in the rundown tank 24 is at a temperature consistent with sufficient hydration, or when a rundown tank hydration measuring device 188 indicates sufficient hydration, the preheating circulation loop is interrupted and the processing circulation loop is established, and the aforementioned THIRD exemplary method can be practiced.

With reference to FIG. 4, a FIFTH exemplary method of operating a molten-salt-indirectly heated screw-type thermal processor in accordance with the present invention entails rehydrating the dehydrated salt, or re-making the melting-point-reduced material, as the case may be, on-site in the rundown tank 24 after ceasing processing and draining the fluid 25 to the rundown tank 24. This method is useful when it is preferred to store liquid hydrated salt instead of letting dehydrated salt solidify. The salt is rehydrated in accordance with the aforementioned FOURTH exemplary method, using the molten salt that was drained into the rundown tank 24.

With reference to any of FIGS. 1-7, a SIXTH exemplary method of operating a molten-salt-indirectly heated screw-type thermal processor in accordance with the present invention is carried out by carefully managing the performance of the pump 26 to avoid excess pressure. This may be done by measuring the pressure of fluid 25 arriving at the thermal processor 22, and delivering the heat transfer fluid 25 to the thermal processor 22 at a flow rate adjusted to effect the correction.

With reference to FIGS. 2-7, a SEVENTH exemplary method of operating a molten-salt-indirectly heated screw-type thermal processor in accordance with the present invention is carried out by elevating the heat transfer fluid 25 relative to the thermal processor 22 so as to establish a gravity fluid 25 pressure head with the heat transfer fluid 25 entering the thermal processor 22 at a pressure at least within the operating heat transfer fluid 25 pressure range. Thus, it becomes unnecessary to modulate pump performance in order to ensure that fluid 25 is delivered at adequate pressure to the thermal processor 22. As long as the fluid 25 is capable of flowing and is being made available to flow downward from the correct height into the heat transfer fluid inlet 38 of the thermal processor 22, there will be a predetermined pressure.

Also with reference to FIGS. 2-7, an EIGHTH exemplary method of operating a molten-salt-indirectly heated screw-type thermal processor in accordance with the present invention is carried out in accordance with the aforementioned SEVENTH exemplary method, with the step, while delivering the fluid 25 to the thermal processor 22, of passively diverting the heat transfer fluid 25 to bypass the thermal processor 22 in an amount sufficient to prevent the pressure exceeding the operating heat transfer fluid 25 pressure range. The gravity tube upper drain 206 fluidly communicating with the gravity tube 204 accomplishes this as do the stem pipe 48 (fluidly connected to the gravity tube upper drain 206) and fill tank 30 (fluidly connected to the gravity tube 204).

When these methods are practiced with structure including a fill tank 30 and a stem pipe 48, greater capacity is available to supply fluid 25 to the thermal processor 22 during, e.g., a momentary interruption of pumping.

Positioning the heat transfer fluid inlets 38 at elevations lower than those of the heat transfer fluid outlets 84 facilitates passive drainage of the heat transfer fluid space 32 at shutdown and clearance of gas from the heat transfer fluid space 32 when fluid 25 fills the heat transfer fluid space 32.

With a vacuum breaker 92 fluidly communicating with the heat transfer fluid outlet 84 at a high elevation relative to the heat transfer fluid space 32, and a vacuum breaker connector tube 93 fluidly connecting the vacuum breaker 92 with the rundown tank headspace portion 40, gas pressure and vacuum will not impede drainage of the heat transfer fluid space 32.

Fluidly connecting the fill tank headspace portion 72 to the rundown tank headspace portion 40 avoids pressure differentials interfering with filling and passive drainage of the fill tank 30 and the heater.

Limiting the operating heat transfer fluid 25 pressure range of the thermal processor 22 to between −12 PSIG and +14.9 PSIG, inclusive, avoids the need to fabricate the thermal processor 22 with a certified pressure boundary material.

Timing of delivery of fluid 25 to the thermal processor 22 is facilitated, during melting, by measuring a temperature of the melting material and starting to deliver the fluid 25 via the heat transfer 25 circulation loop when the measured temperature has reached a predetermined value, and alternatively by measuring the water content of the fluid 25 and starting delivery when the measured water content has reached a predetermined value.

Timing of the addition of a hydration fluid to the heat transfer fluid 25 is facilitated, during melting, by measuring a temperature of the melting material and beginning to add the hydration fluid when the measured temperature has reached a predetermined value.

Steam must be vented from the heater 28 and rundown tank 24 during hydration, and from the fill tank 30, via the gravity tube gas orifice 208 to the rundown tank 24, during dehydration.

A NINTH exemplary method of operating a molten-salt-indirectly heated screw-type thermal processor in accordance with the present invention is carried out by supplying a padding gas to the rundown tank headspace portion 40 when the rundown tank headspace portion 40 is underpressurized relative to the ambient environment, and venting a gas from the rundown tank head space portion 40 when the rundown tank headspace portion 40 is overpressurized relative to the ambient environment. This management of gas pressure differentials prevents vapor lock, vacuum lock and rupture.

At shutdown, when the fluid 25 is passively draining to the rundown tank 24, conducting a gas from the rundown tank headspace portion 40 to the thermal processor 22 fluid 25 outlet via the vacuum breaker 92 relieves vacuum lock in the thermal processor 22.

During start-up and continuous operation, conducting a gas from the thermal processor 22 head space 32 to the rundown tank headspace portion 40 relieves vapor lock which could impede filling of the thermal processor 22.

Also in accordance with the present invention, with reference to FIG. 4, AN EXEMPLARY EMBODIMENT of a phase-separating pressure modulator for molten-salt-indirectly heated screw-type thermal processing apparatus comprises a fill tank 30 having a fill tank bottom portion 36; a heater output tube 80 fluidly communicating with the fill tank 30 at the fill tank bottom portion 36; a gravity tube 204 fluidly communicating with the fill tank 30 at the fill tank bottom portion 36 and fluidly communicating with a fluid delivery destination such as the rundown tank 24; a stem pipe 48 fluidly communicating with the fill tank 30 at an elevation above the fill tank bottom portion 36; a fill tank headspace portion 72 defined as a portion of the fill tank above the elevation where the stem pipe 48 fluidly communicates with the fill tank 30; and a fill tank headspace vent 73 or gravity tube gas orifice 208 fluidly communicating with the fill tank headspace portion 72 and with a fluid drainage destination such as the thermal processor 22. Advantageously, during dehydration, when a mixture of molten salt and water vapor passes from the heater 28 to the fill tank 30, the fill tank separates the steam from the molten salt under the influence of gravity, enabling the steam to escape via the fill tank headspace vent 73 or gravity tube gas orifice 208 while the molten salt fluid 25 flows to the thermal processor 22, rundown tank 24 or both. While this function is performed, the previously described function of regulating the pressure of the fluid 25 at the heat transfer fluid inlets 38 of the thermal processor 22 is also performed.

A pump 26 may refer to any energetic mechanism for urging or circulating a material within the apparatus. A gravity tube gas orifice 208 preferably fluidly communicates with the rundown tank headspace portion 40, as, e.g., via a connector tube. While exemplary apparatus and methods in accordance with the present invention may be claimed with recitation of a molten-salt-indirectly heated screw-type thermal processor, the advantages of embodiments of the apparatus and instances of the method in accordance with the present invention are applicable without strict limitation as to the composition of the heat transfer fluid or as to the type of conveyance if any used in the thermal processor. The apparatus shown in any of FIGS. 1-3 and FIGS. 5-6 should be regarded as being capable of having one or more heating elements 184 as shown in FIG. 4 when and as needed. In most situations, the presence of fire tubes 236 reduces the need for auxiliary heating of the rundown tank fluid containing portion 41. The apparatus shown in FIG. 3 should be regarded as being capable of having a fill tank headspace vent 73 (often useful to vent steam during heating) as shown in, e.g., FIG. 4.

As can be seen from the drawing figures and from the description, each embodiment of the apparatus and method for fluid-heated indirect thermal processing in accordance with the present invention solves a problem by addressing the need for safe, cost-effective, efficient, simple, reliable structure and steps in the thermal processing of materials.

While the specification describes particular embodiments of the present invention, those of ordinary skill can devise variations of the present invention without departing from the inventive concept.

Although specific embodiments have been illustrated and described herein, those of ordinary skill in the art will appreciate that any arrangement calculated to achieve same purposes can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

In the foregoing description, if various features are grouped together in a single embodiment for the purpose of streamlining the disclosure, this method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims, and such other claims as may later be added, are hereby incorporated into the description of the embodiments of the invention, with each claim standing on its own as a separate preferred embodiment.

The invention claimed is:

1. Molten-salt-indirectly heated screw-type thermal processing apparatus, comprising:
   an indirectly heated screw-type thermal processor; a heater; a rundown tank; and a pump,
   the apparatus requiring an operating volume of a heat transfer fluid for transferring heat from said heater to said thermal processor,
   said thermal processor having a heat transfer fluid inlet fluidly communicating with said heater and a heat transfer fluid outlet fluidly communicating with said rundown tank,
   said rundown tank having a fluid-containing portion dimensioned to hold at least said operating volume and having a rundown tank headspace portion above said fluid-containing portion, said rundown tank headspace portion being equipped to relieve a pressure differential between said rundown tank and the ambient environment,
   said pump, said heater, said thermal processor and said rundown tank being operatively connected so as, when said pump is active, to establish a heat transfer circulation loop through said heater and said thermal processor,
   said pump, said heater, said thermal processor and said rundown tank being operatively connected so as, when said pump is inactive, to establish said fluid-containing portion as the fluid passive drainage destination relative to said pump, said heater and said thermal processor;
   the apparatus having a gravity tube, a gravity tube upper drain, a gravity tube gas orifice, and a gravity tube lower drain,
   said gravity tube fluidly communicating with said heat transfer fluid inlet at a first height,
   said gravity tube fluidly communicating with said heater at a second height, said second height being above said first height
   said gravity tube upper drain fluidly communicating with said gravity tube at a third height, said third height being above said second height,
   said gravity tube upper drain fluidly communicating with said rundown tank,
   said gravity tube gas orifice fluidly communicating with said gravity tube at a fourth height, said fourth height being above said third height,
   said gravity tube gas orifice fluidly communicating with said rundown tank headspace portion,
   said gravity tube lower drain fluidly communicating with said gravity tube at a fifth height, said fifth height being below said first height,
   said gravity tube lower drain fluidly communicating with said rundown tank at a sixth height, said sixth height being below said fifth height.

2. Apparatus of claim 1, having a restrictor located in said gravity tube lower drain at a seventh height, said seventh height between said fifth height and said sixth height, said restrictor being dimensioned to restrict fluid conducting capacity of said gravity tube lower drain.

3. Apparatus of claim 1, having a fill tank and a stem pipe,
   said fill tank communicating with said gravity tube at said second height,
   said stem pipe fluidly communicating with said fill tank at said third height and fluidly communicating with said gravity tube upper drain.

4. Apparatus of claim 1, selectively configurable to establish a preheating fluid circulation loop through said rundown tank and to interrupt said heat transfer circulation loop.

5. Apparatus of claim 1, adapted for a heat transfer fluid having a melting point and a density, said first height and said second height being selected such that a column of said heat transfer fluid extending vertically from said first height to said second height exerts pressure at said second height no greater than 14.9 PSIG when said fluid is at said melting point.

6. Apparatus of claim 1, having a pressure sensor proximate said heat transfer fluid inlet of said thermal processor and a pump variable speed control, said pump variable speed control being operatively coupled with said pressure sensor so as to slow said pump when said pressure sensor reports a pressure exceeding a predetermined setpoint below 14.9 PSIG.

7. Apparatus of claim 1, wherein said heat transfer fluid outlet is located above said first height.

8. Molten-salt-indirectly heated screw-type thermal processing apparatus, comprising:
   an indirectly heated screw-type thermal processor; a heater; a rundown tank; and a pump,
   the apparatus requiring an operating volume of a heat transfer fluid for transferring heat from said heater to said thermal processor, said thermal processor having a heat transfer fluid inlet fluidly communicating with said heater and a heat transfer fluid outlet fluidly communicating with said rundown tank, said rundown tank having a fluid-containing portion dimensioned to hold at least said operating volume and having a rundown tank headspace portion above said fluid-containing portion, said rundown tank headspace portion being equipped to relieve a pressure differential between said rundown tank and the ambient environment, said pump, said heater, said thermal processor and said rundown tank being operatively connected so as, when said pump is active, to establish a heat transfer circulation loop through said heater and said thermal processor, said pump, said heater, said thermal processor and said rundown tank being operatively connected so as, when said pump is inactive, to establish said fluid-containing portion as the fluid passive drainage destination relative to said pump, said heater and said thermal processor;

the apparatus having a fluid hydrator and a hydration fluid supply, said fluid hydrator fluidly communicating with said heat transfer circulation loop and with said hydration fluid supply, said hydration fluid supply being selected from among a supply of water, a supply of steam, and a supply of a hydrating solution;

said fluid hydrator being configured to deposit a hydration fluid in said rundown tank.

9. Apparatus of claim 8, said fluid hydrator comprising a nozzle, said nozzle being located in said rundown tank headspace portion and being configured to deposit a hydration fluid in said rundown tank.

10. Apparatus of claim 8, said fluid hydrator comprising a sparge tube located in said fluid-containing portion of said rundown tank.

11. Apparatus of claim 8, said fluid hydrator comprising an eductor.

12. Molten-salt-indirectly heated screw-type thermal processing apparatus, comprising:

an indirectly heated screw-type thermal processor; a heater; a rundown tank; and a pump, the apparatus requiring an operating volume of a heat transfer fluid for transferring heat from said heater to said thermal processor, said thermal processor having a heat transfer fluid inlet fluidly communicating with said heater and a heat transfer fluid outlet fluidly communicating with said rundown tank, said rundown tank having a fluid-containing portion dimensioned to hold at least said operating volume and having a rundown tank headspace portion above said fluid-containing portion, said rundown tank headspace portion being equipped to relieve a pressure differential between said rundown tank and the ambient environment, said pump, said heater, said thermal processor and said rundown tank being operatively connected so as, when said pump is active, to establish a heat transfer circulation loop through said heater and said thermal processor, said pump, said heater, said thermal processor and said rundown tank being operatively connected so as, when said pump is inactive, to establish said fluid-containing portion as the fluid passive drainage destination relative to said pump, said heater and said thermal processor;

the apparatus being equipped to receive a padding gas from a padding gas supply when said rundown tank is underpressurized relative to the ambient environment.

\* \* \* \* \*

UNITED STATES PATENT AND TRADEMARK OFFICE
CERTIFICATE OF CORRECTION

| | | |
|---|---|---|
| PATENT NO. | : 11,193,719 B2 | Page 1 of 1 |
| APPLICATION NO. | : 15/829975 | |
| DATED | : December 7, 2021 | |
| INVENTOR(S) | : John Potee Whitney and Preston Ochs Whitney | |

It is certified that error appears in the above-identified patent and that said Letters Patent is hereby corrected as shown below:

On the Title Page

Add:
Domestic Priority Claim: U.S. Patent Application No. 14/736,266, filed 2015-06-11.

Signed and Sealed this
Twenty-seventh Day of August, 2024

Katherine Kelly Vidal
*Director of the United States Patent and Trademark Office*